United States Patent
Proctor et al.

(10) Patent No.: US 10,430,234 B2
(45) Date of Patent: Oct. 1, 2019

(54) THREAD COORDINATION IN A RULE ENGINE USING A STATE MACHINE

(71) Applicant: Red Hat, Inc., Raleigh, NC (US)

(72) Inventors: Mark Proctor, London (GB); Mario Fusco, Milan (IT)

(73) Assignee: Red Hat, Inc., Raleigh, NC (US)

( * ) Notice: Subject to any disclaimer, the term of this patent is extended or adjusted under 35 U.S.C. 154(b) by 899 days.

(21) Appl. No.: 15/044,913

(22) Filed: Feb. 16, 2016

(65) Prior Publication Data

US 2017/0236062 A1    Aug. 17, 2017

(51) Int. Cl.
| | | |
|---|---|---|
| G06F 9/48 | (2006.01) | |
| G06F 9/50 | (2006.01) | |
| G06F 9/52 | (2006.01) | |
| G06N 5/04 | (2006.01) | |

(52) U.S. Cl.
CPC .............. *G06F 9/4881* (2013.01); *G06F 9/48* (2013.01); *G06F 9/4806* (2013.01); *G06F 9/4843* (2013.01); *G06F 9/50* (2013.01); *G06F 9/5005* (2013.01); *G06F 9/52* (2013.01); *G06N 5/047* (2013.01)

(58) Field of Classification Search
CPC ........ G06F 9/48; G06F 9/4806; G06F 9/4843; G06F 9/4881; G06F 9/50; G06F 9/5005; G06F 9/52
See application file for complete search history.

(56) References Cited

U.S. PATENT DOCUMENTS

| | | |
|---|---|---|
| 7,089,340 B2 | 8/2006 | Penkovski et al. |
| 8,332,864 B2 | 12/2012 | Bose et al. |
| 8,336,056 B1 * | 12/2012 | Gadir .................... G06F 9/5027 718/100 |

(Continued)

FOREIGN PATENT DOCUMENTS

| | | |
|---|---|---|
| CN | 103064909 A | 4/2013 |
| WO | 2014093198 A1 | 6/2014 |

OTHER PUBLICATIONS

"Multithreaing in Java—Drools and Database", http://stackoverflow.com/questions/13761445/multithreaing-in-java-drools-and-database, 2 pages, Dec. 7, 2012.

(Continued)

*Primary Examiner* — Charles M Swift
(74) *Attorney, Agent, or Firm* — Lowenstein Sandler LLP

(57) ABSTRACT

A processing device executes a multi-threaded rule engine having multiple threads. A first thread is associated with user interactions. A second thread is associated with timing events. A third thread is associated with asynchronous execution of the rule engine. A rule engine core is accessible to the second and third threads. The processing device receives user input and generates a first command to perform a first action in view of the user input while executing the first thread. The processing device stores the first command in a queue where the first command is one of multiple commands stored in the queue. The processing device retrieves the multiple commands from the queue and processes the multiple commands using the rule engine core while executing the third thread. The rule engine core is inaccessible to the second thread while in use by the third thread.

20 Claims, 21 Drawing Sheets

(56) References Cited

U.S. PATENT DOCUMENTS

| | | | | |
|---|---|---|---|---|
| 8,635,293 | B2* | 1/2014 | Fisher | G06Q 10/107 709/204 |
| 8,856,058 | B1 | 10/2014 | Martin et al. | |
| 9,280,444 | B2* | 3/2016 | Scheerer | G06F 11/3632 |
| 2002/0156664 | A1 | 10/2002 | Willcox et al. | |
| 2005/0091611 | A1* | 4/2005 | Colleran | G06F 11/1415 715/804 |
| 2005/0120237 | A1* | 6/2005 | Roux | G06F 9/4843 726/26 |
| 2006/0112061 | A1 | 5/2006 | Masurkar | |
| 2006/0150183 | A1* | 7/2006 | Chinya | G06F 9/45533 718/100 |
| 2008/0065443 | A1 | 3/2008 | Gorur et al. | |
| 2009/0077105 | A1* | 3/2009 | DeAnna | G06F 9/465 |
| 2009/0193434 | A1* | 7/2009 | Rivard | G06F 9/451 719/315 |
| 2011/0289503 | A1* | 11/2011 | Toub | G06F 9/4843 718/102 |
| 2013/0067481 | A1* | 3/2013 | Anderson | G08B 3/00 718/102 |
| 2013/0297604 | A1* | 11/2013 | Sutedja | G06Q 10/107 707/737 |
| 2014/0325520 | A1* | 10/2014 | Bacchus | G06F 9/5016 718/104 |

OTHER PUBLICATIONS

Zdenek Hrib, "Using jBPM as State Machine Engine—Is It a Good Idea?", 4 pages, Nov. 25, 2012.

Mario Sanchez et al., "A State Machine Based Coordination Model Applied to Workflow Applications", ACM Conference '04, 10 pages, 2004.

"2.5. The Drools Rule Engine", https://access.redhat.com/documentation/en-US/JBoss_Enterprise_SOA_Plafform/4.2/html/JBoss_Rules_Manual/sect-JBoss_Rules_Reference_Manual-The_Drools_Rule_Engine.html, 42 pages, retrieved on Sep. 21, 2015.

Wikipedia, "Strategy Pattern", https://en.wikipedia.org/wiki/Strategy_pattern, 7 pages, Aug. 19, 2015.

"Multithreading—What is a race condition?—Stack Overflow", http://stackoverflow.com/questions/34510/what-is-a-race-condition, 11 pages, Aug. 29, 2008.

* cited by examiner

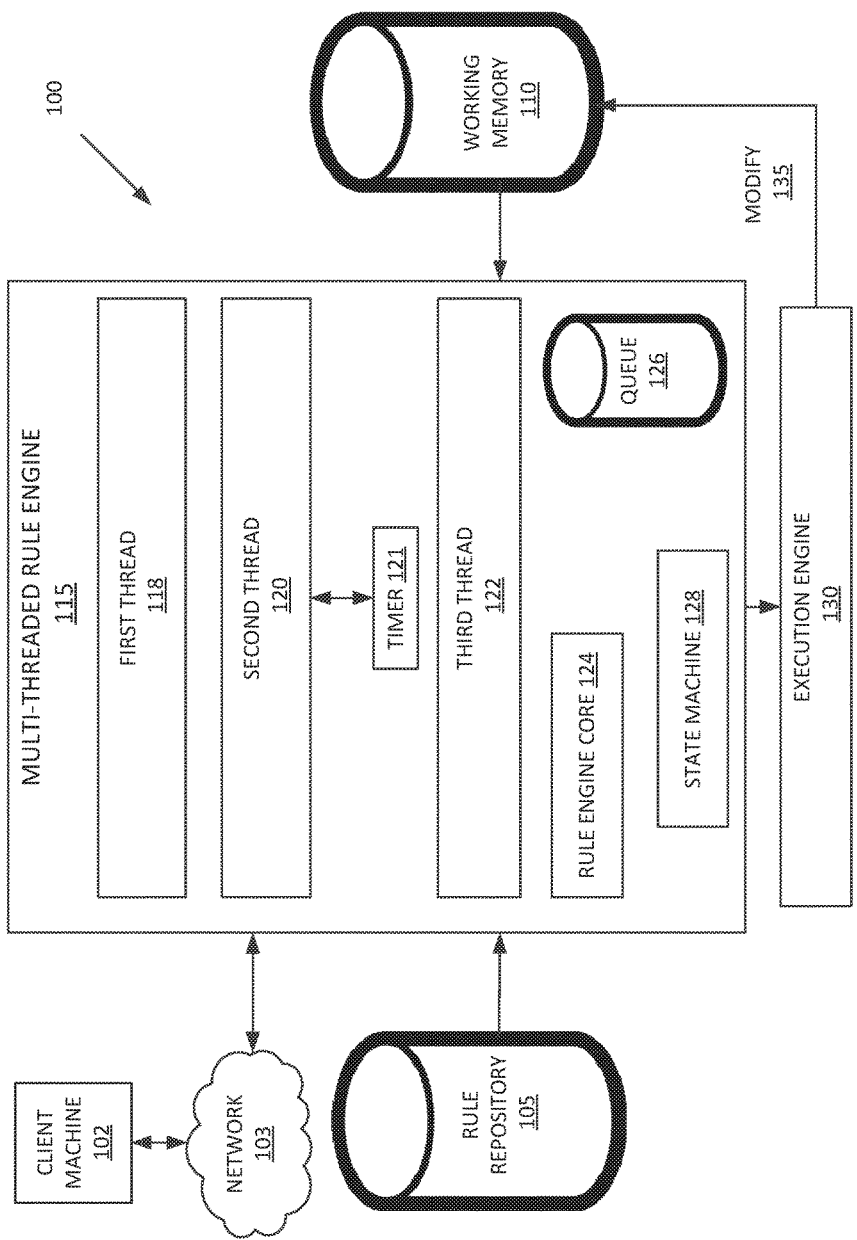

THREAD COORDINATION IN A RULE ENGINE USING A STATE MACHINE

TECHNICAL FIELD

Embodiments of the present invention relate to a rule engine, and more specifically to thread coordination of threads in a rule engine using a state machine.

BACKGROUND

The development and application of rule engines is one branch of Artificial Intelligence (A.I.), which is a research area that focuses on "making computers think like people." Broadly speaking, a rule engine processes information by applying rules to data objects (also known as facts). Various types of rule engines have been developed to evaluate and process rules. A rule engine may utilize a network to process rules and data objects. An object is compared against each of the rules in a rule set to determine whether the object satisfies all of the constraints of any of the rules. An object that satisfies all of the constraints associated with a rule may then be modified based on an action associated with that rule.

BRIEF DESCRIPTION OF THE DRAWINGS

The present invention is illustrated by way of example, and not by way of limitation, in the figures of the accompanying drawings and in which:

FIG. 1 illustrates an example system that implements a multi-threaded rule engine.

DETAILED DESCRIPTION

Figure 2A:
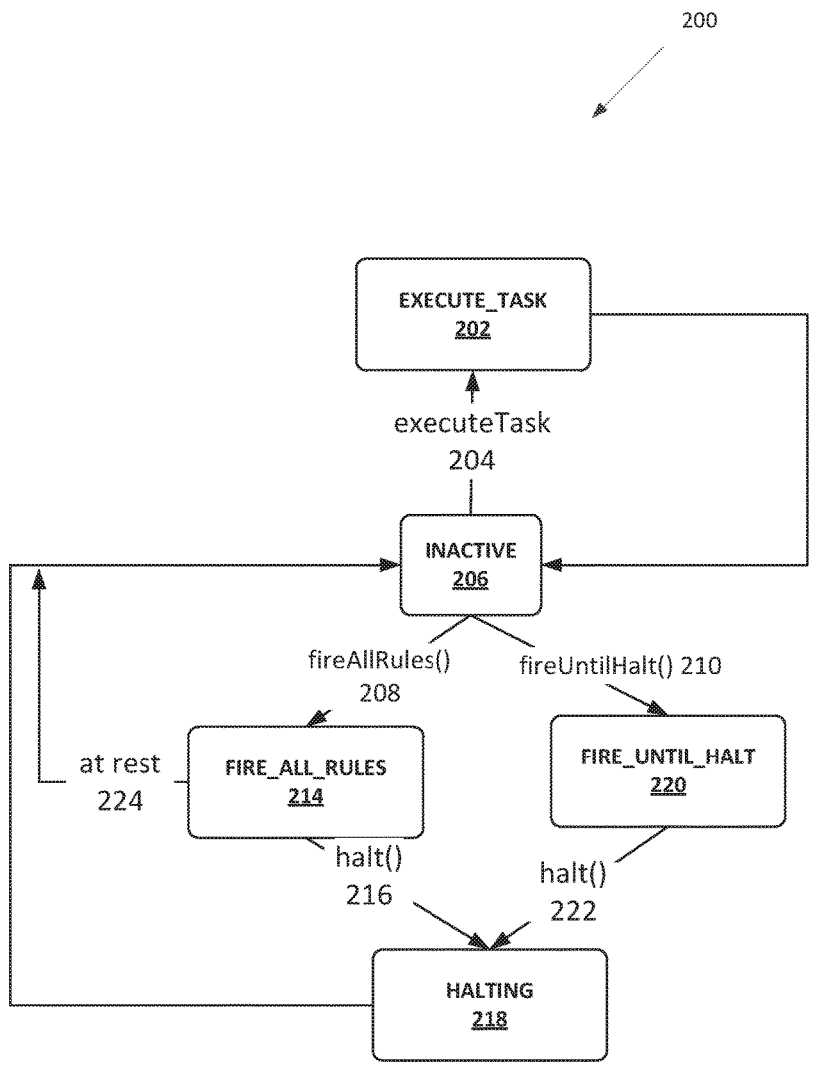
FIG. 2A illustrates an exemplary state diagram of a state machine, in accordance with one embodiment of the present invention.

Described herein are some embodiments of a rule engine having multiple threads that are coordinated using a state machine. In an embodiment, the rule engine includes a user thread, a timer thread, and an engine thread, which may all be coordinated using the rule engine. The rule engine may additionally include a rule engine core, a queue, and a state machine. The rule engine core enforces rules in the rule engine. The rule engine core is accessible to the timer thread and the engine thread. Each of the user thread, the timer thread, and the engine thread may access the queue. The user thread may be associated with user interactions. The timer thread may be associated with timing events. The engine thread may be associated with asynchronous execution of the rule engine. The state machine coordinates the execution of all of the threads. When the rule engine core is accessed by any one of the timer thread or the engine thread and the thread executes a command, the other threads may temporarily be unable to access the queue.

One of the threads may provide an action to the rule engine. An action may be an action to insert, update, or delete data in an object and/or in working memory. The action that is to be processed is stored in the queue. The queue may store the action as a command. The queue may store one or more commands that are to be processed. The commands may be retrieved by the rule engine core for processing when the rule engine core is controlled by an appropriate thread.

A thread (i.e., the first thread, the second thread, or the third thread) may place the action in the queue. The queue stores the actions as commands, and the commands may be retrieved from the queue by the second thread or third thread for processing by the rule engine core when the state machine grants the third thread or the second thread access to the rule engine core.

In one embodiment, a single thread may access or execute the rule engine core at one time. In an embodiment, the rule engine core may be accessed by either the second thread or the third thread. The first thread may not access the rule engine core, but the first thread may place actions onto the queue for the rule engine core (via the third thread) to execute. The state machine may place the multi-threaded rule engine (and/or the rule engine core) in an appropriate state in order to execute either the second thread or the third thread. A state of the state machine may be determined in view of user input or data that is input by other means.

A multi-threaded rule engine includes multiple threads that may run parallel to one another during execution. By using the state machine, the multi-threaded rule engine can control which threads are executed and can block one or more threads from accessing the rule engine core while another thread is accessing the rule engine core.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "executing" or "receiving" or "generating" or "storing" or "retrieving" or "processing" or the like, refer to the action and processes of a computing device, or similar electronic computing device, that manipulates and transforms data represented as physical (electronic) quantities within the computing device's registers and memories into other data similarly represented as physical quantities within the computing device memories or registers.

FIG. 1 illustrates an example system 100 that implements a multi-threaded rule engine 115. The system 100 includes a rule repository 105, a working memory 110, a client machine 102, and an execution engine 130 in addition to the multi-threaded rule engine 115. The rule repository 105 (also referred to as a production memory) may include an area of memory and/or secondary storage that containing rules that may be used to evaluate objects. The rule repository 105 may include a directory of a file system, may be a rule database, may be a table of rules, or may be some other data structure for storing a rule set (also referred to as a rule base). The multi-threaded rule engine 115 processes information by applying rules to data objects (also known as facts). An object is compared against each of the rules in a rule set in the rule repository 105 to determine whether the object satisfies all of the constraints of any of the rules. An object that satisfies all of the constraints associated with a rule may then be modified based on an action associated with that rule. An action may be initiated by a thread in the multi-threaded rule engine 115. Examples of actions include inserting an object into working memory, updating an object, or deleting an object.

The working memory 110 stores data objects (also referred to as facts) that have been asserted (e.g., objects that are to be matched against the rule set). These data object may be asserted (e.g., added to working memory for processing through a network of rules such as a Rete network) via an action.

Execution engine 130 may execute operations for objects (e.g., facts) that have been processed by a network of rules. Often, such execution of operations may cause the properties of one or more objects to be modified. If an object is to be modified, the execution engine 130 modifies 135 the object in working memory 110, and the multi-threaded rule engine 115 again evaluates the modified object using a network.

In an embodiment, the multi-threaded rule engine 115 may be a Rete rule engine, a Phreak rule engine, or another rule engine.

The multi-threaded rule engine 115 includes a first thread 118, a second thread 120, a third thread 122, a rule engine core 124, a queue 126, and a state machine 128. The first thread 118 may be a user thread. The second thread 120 may be a timer thread. The third thread 122 may be an engine thread. The second thread 120 and the third thread 122 may access the rule engine core 124. Each of the first thread 118, the second thread 120 and the third thread 122 may issue actions for processing by the rule engine core 124. In an embodiment, one thread (i.e., either the second thread 120 or the third thread 122) may access the rule engine core 124 by itself at a given time. Accessing a rule engine core includes performing a write operation by the accessing thread. The state machine 128 determines a state of the rule engine core 124 in order to allow the second thread 120 or the third thread 122 to access the rule engine core 124.

For brevity and simplicity, the term queue is used herein. However, a queue may specifically be described as a propagation queue. For brevity and simplicity, the following threads are described herein: the first thread 118, the second thread 120 and the third thread 122. However, the first thread 118 may also be referred to herein as a user thread; the second thread 120 may also be referred to herein as a timer thread; and the third thread 122 may also be referred to as an engine thread that is associated with asynchronous execution of the rule engine. The first thread 118 may receive actions from user devices. The first thread 118 may append actions to the queue 126 in view of user interactions. The first thread 118 may not access the rule engine core 124 in embodiments. The second thread 120 may control timing events and set a timer in view of user interactions or in view of rules. The second thread 120 may access the rule engine core 124 in embodiments. The second thread 120 may retrieve a command that is placed on the queue 126 by the second thread 120 and execute the command when accessing the rule engine core 124. The third thread 122 that is associated with asynchronous execution of the rule engine may access the rule engine core 124 when it is not accessed by the second thread 120. The third thread 122 may retrieve one or more commands that are stored on the queue 126 and flush out the queue when accessing the rule engine core 124.

Any of the first thread 118, the second thread 120 or the third thread 122 can access and add actions to the queue 126 (also referred to as a propagation queue). For example, the first thread 118 may append actions to the queue 126 in view of user interactions (e.g., user interactions with the client machine 102, where the client machine 102 provides information on the interactions to the first thread 118 via network 103). The second thread 120 may control timing events. The second thread 120 may be coupled to a timer 121, and may add actions to the queue 126, for example, when the timer expires (times out).

The client machine 102 may be coupled via network 103, which may communicate using any of the standard protocols for the exchange of information. The client machine 102 may run on a Local Area Network (LAN). Alternatively, the client machine 102 and multi-threaded rule engine 115 may reside on different LANs that may be coupled together via the Internet but separated by firewalls, routers, and/or other network devices. In yet another configuration, the client machine 102 may reside on a server, or different servers, coupled to other devices via a public network (e.g., the Internet) or a private network (e.g., LAN). The network 103 may be a public network, a private network, or a combination thereof. Network 103 may include a wireless infrastructure. The wireless infrastructure may be provided by one or multiple wireless communications systems, such as a Wi-Fi hotspot connected with the network 103, and/or a wireless carrier system that may be implemented using various data processing equipment, communication towers, etc. It should be noted that various other network configurations may be used including, for example, hosted configurations, distributed configurations, centralized configurations, etc. Although one client machine 102 is depicted in FIG. 1, additional client machines may be included.

When an action is input into the multi-threaded rule engine 115, the action may be added to the queue 126 by one of the threads. The action may be input by any of the first thread 118, the second thread 120, or the third thread 122 and stored as a command in the queue 126. One or more of the commands stored in the queue 126 may be processed by the rule engine core 124 when it is accessed by the second thread 120 or the third thread 122. The state machine 128 may control the rule engine core 124 by placing the rule engine core 124 in a particular state. When the rule engine core 124 is placed in an appropriate state by the state machine 128 to process one or more commands, one of the threads executes the rule engine core 124 e to process the commands. Details regarding the states of the state machine 128 are described herein with regard to FIGS. 2A-2O.

The queue 126 may be an intermediary between the second thread 120 and the third thread 122 and the rule engine core 124. All actions may be placed in the queue 126 before the rule engine core 124 retrieves them for processing. The queue 126 (along with the state machine 128) may restrict the threads such that one thread can access the rule engine core 124 by itself at a given time (i.e., during a write operation that occurs when processing a command) such that another thread may not access the rule engine core 124 during execution of the one thread. During execution of a thread, the multi-threaded rule engine 115 may behave similar to a single threaded engine, as one thread may access the rule engine core 124 by itself during a given time.

The queue 126 may be a specialized queue that allows insertion of individual actions or removal of individual actions. The queue 126 may also store a batch of commands. The rule engine core 124 may take all of the commands stored within the batch from the queue 126 after being placed in an appropriate state by the state machine 128. When the third thread 122 accesses the rule engine core 124, the state machine 128 allows the rule engine core 124 to collect all of the commands that have not yet been executed from the queue 126. The commands may be taken all at once if they are batched. In certain modes of operation, commands are retrieved one at a time or in batches from the queue as they are added to the queue 126.

The state machine 128 facilitates the rule engine core 124 to take all of the commands by determining whether the queue 126 is empty. If the queue 126 is not empty, the state machine 128 may not change an old state of rule engine core 124 until the queue 126 empties. After the queue 126 is empty, the state machine 128 may place the rule engine core 124 in a new, different state so that another thread (i.e., the second thread 120) or the same thread (i.e., the third tread 122) may access the rule engine core 124. Therefore, in one embodiment, the state machine 128 may change a state of the rule engine core 124 based on whether or not the queue 126 is empty as a result of a "take all" command which aggregates/collects all of the commands in the queue.

When the rule engine core 124 takes all of the commands from the queue 126, the following may result. If the queue 126 is not empty, the queue 126 may return a list to the rule engine core 124 along with the commands. The list may be a linked list and the commands may be batched. If the queue 126 is empty, the queue 126 may return a null operation indicative of the queue 126 being empty. When a new action is added to the queue 126, the state machine 128 determines whether to batch the command associated with the action with other commands (when the queue 126 is not empty) or to allow the rule engine core 124 to retrieve the single command from the queue 126 (when the queue 126 is empty).

In an example, suppose that the first thread 118 is providing one or more actions (commands) to the queue 126. The first thread 118 may be providing an insert action. At substantially the same time, the second thread 120 may be providing timing events to the queue 126. Also at substantially the same time, the third thread 122 may be accessing the rule engine core 124. While the third thread 122 is accessing the rule engine core 124, the first thread 118 and the second thread 120 may add actions to the queue 126. When the commands initiated by the third thread 122 have been completely processed by the rule engine core 124, the state machine 128 facilitates the rule engine core 124 to take all of the additional commands placed in the queue by the first thread 118 and the second thread 120.

In an embodiment, processing of commands from the queue 126 by the rule engine core 124 is an atomic transaction. The rule engine core 124 may retrieve either all of the commands in a batch from the queue 126 or none.

The state machine 128 communicates with the queue 126 in order to inform the rule engine core 124 as to what the rule engine core 124 should process. The state machine 128 keeps tracks of the timer and user threads in order to minimize synchronization points. The state machine 128 may take the place of synchronization points so that placement of synchronization points is not implemented or placement of synchronization points is minimized. The state machine 128 may also act as a synchronization point in embodiments. The state machine 128 may be in an INACTIVE state when threads are not executing the rule engine core 115. When a first thread (i.e., a timer or engine thread) executes the rule engine 115 to execute an operation, the state of the state machine 128 changes from an INACTIVE state to different state (depending on what the execution thread is performing). The state may change from an INACTIVE state to a FIRE_ALL_RULES state or a FIRE_UNTIL_HALT state, for example. When the state changes (and when the state is not an INACTIVE state), if a second thread (i.e., a timer or engine thread) attempts to execute the rule engine 115, the second thread is informed that the state machine 128 is no longer in an INACTIVE state and the second thread is blocked and placed into a wait state. When the first thread finishes executing the rule engine 115, the state of the state machine 128 changes back to the INACTIVE state and the second thread which is waiting is woken up. Therefore, the state machine 128 acts as a synchronization point.

In an example, the timer thread or the engine thread may access the rule engine core 124 for a certain amount of time. The thread which is not accessing the rule engine core 124 may be blocked from accessing the rule engine core 124 during the certain amount of time but may otherwise access the rule engine core 124. During the certain amount of time, the rule engine core 124 may be processing a write operation (or other operation) on an object. The write operation may occur at the very end of processing a command associated with the object. When the write operation occurs, the other threads which are not accessing the rule engine core may not access the propagation queue 126. This way, other threads may not access the propagation queue 126 while a write operation is processed, but may access the propagation queue 126 once the write operation completes. Thus, the state machine 128 centralizes the timer thread and the engine thread to facilitate a thread to access the rule engine core 124 and blocks other threads from accessing the propagation queue 126 for a relatively short amount of time (i.e., while the write operation is executed).

One thread may access the rule engine core 124 at one time. When a thread is locked out from executing the rule engine 115 (and thus locked out from accessing the rule engine core 124), that thread (as well as other threads) can append actions to the queue 126 as long as an operation is not being executed and as long as a lock is not placed on the queue 126. Also, even though a user thread may not directly access the rule engine core 124, the user thread can also append actions to the queue 126. For example, the first thread 118 may queue up the action (to be processed by the third thread 122 accessing the rule engine core 124) by placing it in the queue 126. The queue 126 stores the action as a command to be processed. Before the command is processed by the rule engine core 124, the first thread 118 may queue up a second action. The state machine 128 may not lock out the first thread 118 from placing the action in the queue 126 as the rule engine core 124 has not yet processed the first action. The second thread 120 may set the timer 121, which may or may not be related to one of the actions of the first thread 118. If the rule engine core 124 may not have yet processed a write operation, the second thread 120 is also not locked out by the state machine 128 from performing a task (i.e., setting the timer 121). Thus, the multiple threads are not locked out from queuing up actions on the queue 126 until a write operation is processed by the rule engine core 124. If the timer 121 times out, the second thread 120 may place an action onto the queue 126. The action may include a write operation. When the write operation is processed by the rule engine core 124 (accessed by the second thread 120 or the third thread 122), the propagation queue 126 is temporarily inaccessible to other threads. When the write operation is completed, the other threads can then access the propagation queue 126.

In a single-threaded rule engine, a single thread may be executed. In an alternative multi-threaded rule engine, multiple threads may run in parallel to one another during execution. The parallel threads may access the same object around the same time, which may lead to interference with each other. Multiple synchronization points may be set for objects in an effort to reduce collisions between the multiple threads (which may lead to errors) during execution of the threads. At a synchronization point, one thread may access an object while the other threads are locked during the time that the one thread is executing. A synchronization point may be placed upon every action that is to be performed on an object. The setting of synchronization points (especially a large number of synchronization points) may not minimize deadlocks or race conditions that may occur when multiple threads access objects and try to make changes to the objects simultaneously. Thus, the setting of synchronization points may not provide a solution to deadlocks or race conditions. Deadlocks or race conditions may occur when two or more threads are attempting to access the same object and each of the threads wait for the other thread(s) to finish. As no thread is actually accessing the object and all threads are waiting to do so, the threads may wait in an infinite loop. The deadlocks or race conditions may lead to an unstable system.

In alternative multi-threaded implementations, when an action such as inserting a fact into a database is executed, other threads may be locked for a long period of time from accessing a queue, as the locking would occur for an entire process of the insertion of the fact. Suppose that another thread wanted to interact with a queue while the one action was being performed. The other thread would have to wait for a considerable amount of time until the one action completely finishes before performing any other actions (such as appending an action in a queue).

As described above, the state machine 128 and the propagation queue 126 may allow the timer thread and the engine thread to access the rule engine core 124 as well as the queue 126. In an embodiment, when either the timer thread or the engine thread access the rule engine core 124 to execute a write operation (or other operation), the other threads which are not accessing the rule engine core 124 may be temporarily blocked from accessing the propagation queue 126 until the write operation (or other operation) is complete as a synchronization point is placed on the propagation queue 126. After the block is removed, the threads may access the propagation queue 126 to append actions, etc., to the propagation queue 126. While one thread (i.e., an engine thread) accesses the rule engine core 124, another thread (i.e., the timer thread) may not access the rule engine core 124.

The interaction of the queue 126 with the state machine 128 may provide maximization of throughput when compared to single-threaded systems or multi-threaded systems which place locks on threads for an entire duration of processing an action (e.g., such as insertion of a fact into a database).

In an embodiment, the state machine 128 may use a certain number of locks or synchronization points to coordinate the threads. The number of synchronization points used may be minimized as a synchronization point may be placed on a queue when a thread is accessing a rule engine core to execute an operation and not at other times (such as when a thread is appending to the queue), as in other systems. When a synchronization point is placed on a queue, other threads may temporarily be blocked from accessing the queue (also referred to as other threads being "paused"). By minimizing the locks, the threads may not be paused as often, which may increase the throughput of the system as each thread may be able to maximize performance due to lesser pausing. Therefore, the multiple threads may run in parallel more often than in alternative implementations because there are fewer synchronization points set that lock out or pause threads.

When a synchronization point is placed on a queue, the queue is locked. In an embodiment, the placement of a synchronization point on the queue is also referred to as placing a lock object on the queue. The queue may be locked when various methods are implemented. For example, the queue may be locked when a "takeAll" method is invoked (described below) or when an action is to be added to the queue when the state machine 128 places the rule engine in a particular state. "Sync(queueLock)" refers to a lock or synchronization point placed on the queue.

A synchronization point may also be placed on the rule engine 115. When a synchronization point is placed on the rule engine, a thread that does not execute the rule engine may temporarily not execute the rule engine until the rule engine becomes available. For example, if a timer thread executes the rule engine, the engine thread may not execute the rule engine until the timer thread finishes. In an embodiment, a synchronization point or a lock object may be placed on the rule engine when the state machine transitions states. The synchronization point may be implemented using the state machine. The various states of the state machines are described below. "Sync(engineLock)" refers to a lock or synchronization point placed on the rule engine.

The state machine 128 may place the rule engine core 124 into a particular state immediately after receiving an action from a thread. Alternatively, the state machine 128 may wait before placing the rule engine core 124 into a particular state. For example, if the rule engine core 124 is in a first state that may not be interrupted before completion, the state machine 128 may wait until the rule engine core 124 can exit the first state (i.e., upon completion of the first state) before placing the rule engine core 124 into the particular state.

The second thread 120 or the third thread 122 may communicate with the state machine 128 and, in turn, may execute the rule engine core 124.

The second thread 120 may set one or more timers related to processing of commands. Suppose, for example, that the second thread 120 is to set the timer 121 for a timing event based on a rule. The rule may be contained in the rule repository 105. The rule may state that upon input of a first action, a first acknowledgment should be received within fifteen seconds of the input of the first action. If an acknowledgment is not received within fifteen seconds, the rule in the repository 105 specifies that an error should be reported.

If a first acknowledgment is received within fifteen seconds, the timer should be reset. At the expiration of a timer, the second thread may place an action on the queue 126, remove an action from the queue 126, and/or perform another operation.

If a first action is received by the first thread 118, the first thread 118 places the first action in the queue 126 (as a command) and the queue 126 informs the state machine 128 of the first action/command. The state machine 128 determines whether the third thread 122 (i.e., the asynchronous engine thread) should to be notified in order to process the first action/command using one or more associated rules. The determination of whether the third thread 122 should be notified or not is based upon a state of the rule engine core 124, which in turn indicates whether the third thread 122 is currently in use (i.e., awake) or not currently in use (i.e., parked).

If the rule engine core 124 is in use and accessing the third thread 122 to process the first action/command, the second thread 120 sets the timer 121 to fifteen seconds. The second thread 120 may then access rule engine core 124, after the third thread 122 finishes accessing the rule engine core 124.

If a first acknowledgment is received by the first thread 118, the first thread 118 places the first acknowledgment in the queue 126. The queue 126 informs the state machine 128 of the acknowledgment. The third thread 122 accesses the rule engine core 124, which processes the queue 126 and retrieves the first acknowledgment. The rule engine core 124 checks the first acknowledgment against the timer 121 set by the second thread 120 to determine whether the acknowledgment is received within fifteen seconds. If it is, the rule engine core 124 resets the timer 121, via the second thread 120. If not, the rule engine core 124 then fires a rule that specifies that an error should be reported (as a first acknowledgment was not received within fifteen seconds), via the third thread 122. If a first acknowledgment is not received within fifteen seconds, the second thread 120, upon expiration of the timer 121, communicates with the state machine 128 to access the rule engine core 124. The rule engine core 124 then fires a rule that specifies that an error should be reported, via the third thread 122.

In an implementation, after the rule engine core 124 completes processing of all the commands in the queue 126, the rule engine core 124 may be placed in a rest state by the state machine 128. The rule engine core 124 is in a rest state when it is not accessed by any thread. The resting of the rule engine core 124 provides for greater efficiency, as the rule engine core 124 is awake or in a non-resting state when it is in use and/or otherwise needed. For brevity and simplicity, the term state is used herein. However, the term mode may be synonymous with the term state.

FIG. 2A illustrates an exemplary state diagram 200 of a state machine, in accordance with one embodiment of the present invention. The state diagram 200 provides various states of the state machine 128 (shown in FIG. 1). The state diagram 200 depicts various states of the state machine as determined based on various methods (described herein). In an embodiment, the states of a state diagram 200 also represent states of a rule engine. In an embodiment, the state diagram 200 begins at an INACTIVE state 206. When the rule engine is in an INACTIVE state 206, there are three potential points of entry into a next state in order to perform engine evaluation and/or rule firing. The rule engine may enter an EXECUTE_TASK state 202, via an executeTask 204 method. The executeTask 204 is also known as an asynchronous time rule. The executeTask 204 method may allow the state machine 128 to execute a given command and enter into the EXECUTE_TASK state 202 in order to execute the given command without entering into other states, as the EXECUTE_TASK state 202 is reached by the executeTask 204 method when issued from the INACTIVE state 206. In the EXECUTE_TASK state 202, the command may be executed by either the timer thread or the engine thread accessing the rule engine core and after the command finishes executing, the state machine 200 returns to the INACTIVE state 206. In an embodiment, the timer thread executes the command in the EXECUTE_TASK state 202 when a timed action is to be performed (e.g., the expiration of a timer set for a timed event triggers execution of an action to remove the event from the working memory) Details regarding the executeTask 204 method are described herein with respect to FIG. 2O.

The rule engine core may be in different states as determined by the state machine and the state diagram. The states may be broadly divided into a passive state and a reactive state. The passive state corresponds to the FIRE_ALL_RULES state 214 and the reactive state corresponds to the FIRE_UNTIL_HALT state 220. In a reactive state, the engine thread may process commands that have been previously provided on the queue. The engine thread may additionally process any new commands placed on the queue. The command(s) may be issued by any thread (i.e., user thread, engine thread or timer thread). In a passive state the rule engine core processes all of the commands that were in the queue when a fire all rules command was issued, but does not continue to process commands after these initial commands are processed.

The rule engine core may enter a FIRE_UNTIL_HALT state 220, via fireUntilHalt( ) 210 method. The FIRE_UNTIL_HALT state 220 is a reactive state that is reached from the INACTIVE state 206 when the rule engine core 124 is accessed by the engine thread to execute commands. The state machine 128 may exit the FIRE_UNTIL_HALT state 220 upon issuance of a halt( ) 222.

The rule engine may also enter a FIRE_ALL_RULES state 214, via fireAllRules( ) 208 method. The FIRE_ALL_RULES state 214 is a passive state that is reached from the INACTIVE state 206 when the state machine 128 is not currently executing commands and fireAllRules( ) 208 method is called. When fireAllRules( ) 208 method is called, a command may be executed by a timer thread or an engine thread by accessing the rule engine core. The state machine 128 may exit the FIRE_ALL_RULES state 214 upon issuance of a halt( ) 216.

Figure 2B:
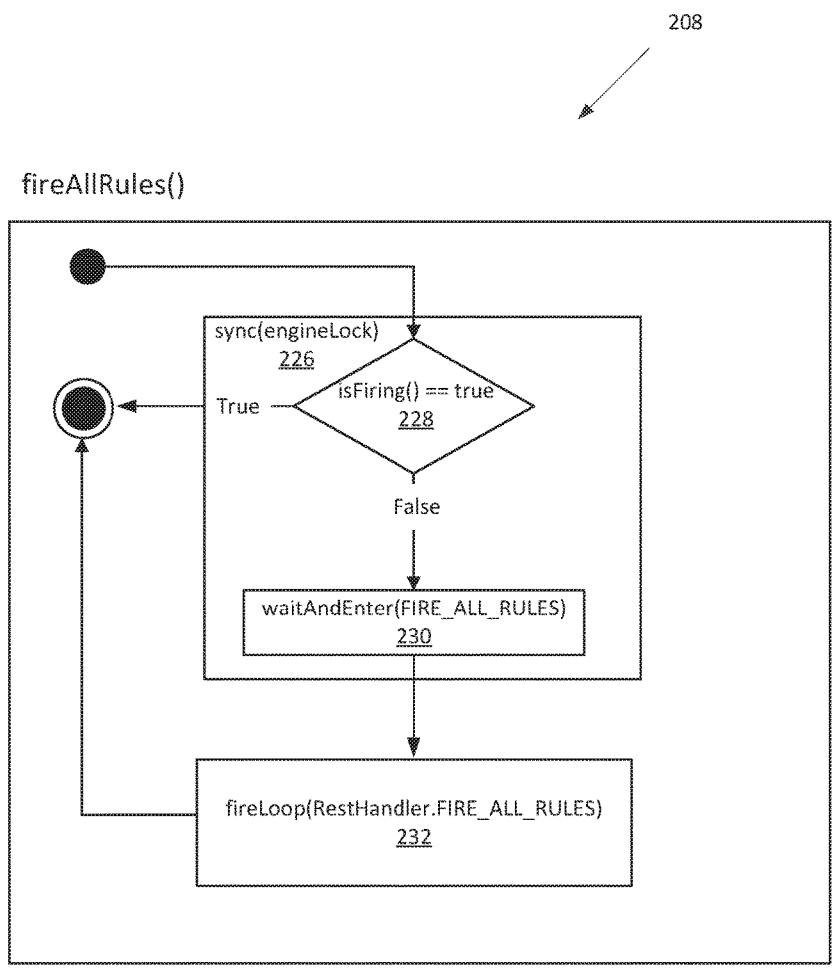
FIGS. 2B-2O illustrate flow charts of various methods used by the state machine to transition between states, in accordance with embodiments of the present invention.
Figure 2C:
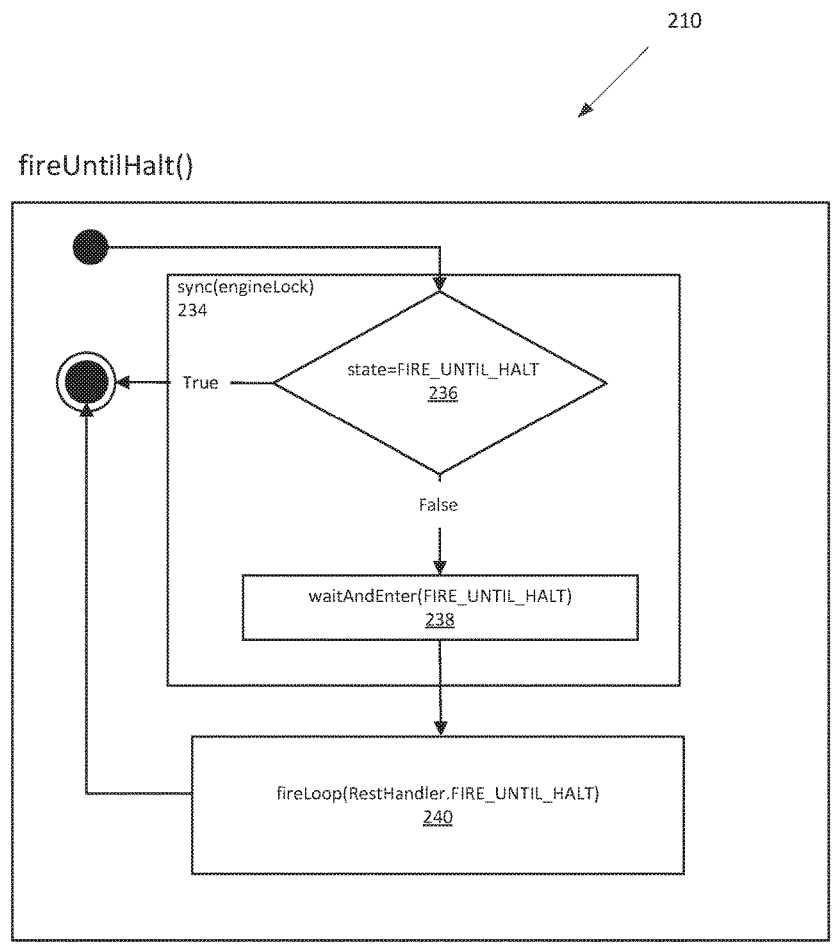

As described in FIGS. 2B and 2C, fireAllRules( ) 208 and fireUntilHalt( ) 210 methods, respectively, may be unified into a single fireLoop method (see FIG. 2B, reference no. 232 and FIG. 2C, reference no. 240). The single fireLoop method may be a strategy class which is passed as an argument to handle a potential rest state of the loop. A strategy class is a class that implements a strategy pattern. A strategy pattern is a pattern that enables a behavior of an algorithm to be selected at runtime.

Referring again to FIG. 2A, the state diagram (and rule engine) is considered at rest when no rules are firing, when there are no more agenda groups to evaluate, and when the queue is empty. Agenda groups allow placement of rules into groups and placement of the groups onto a memory stack. When a rule engine evaluates a stack, the rule engine may begin evaluation at a top of a stack in a last-in, first-out fashion. When all rules within a group have been fired, a next agenda group is taken by the rule engine from the stack and a next group is evaluated. The rule engine may alternatively evaluate the stack in any order. The FIRE_

ALL_RULES state 214 may place the rule engine in the INACTIVE state 206 (shown as at rest 224) in response to the rule engine being at rest.

When the rule engine is in the FIRE_UNTIL_HALT state 220, any current thread that wishes to access the rule engine waits until additional commands enter in the queue for processing. The rule engine enters into the HALTING state 218, via halt( ) 222. Similarly, when in the FIRE_ALL_RULES state 214 (and when the rule engine is not at rest), any thread that wishes to access the rule engine waits until additional commands enter in the queue for processing. The rule engine enters into the HALTING state 218, via halt ( ) 216.

When the halt ( ) 222 method is called, the thread previously accessing the rule engine core stops accessing the rule engine core and the state machine enters the HALTING state 218. The state machine then proceeds from the HALTING state 218 to the INACTIVE state 206.

Figure 2D:
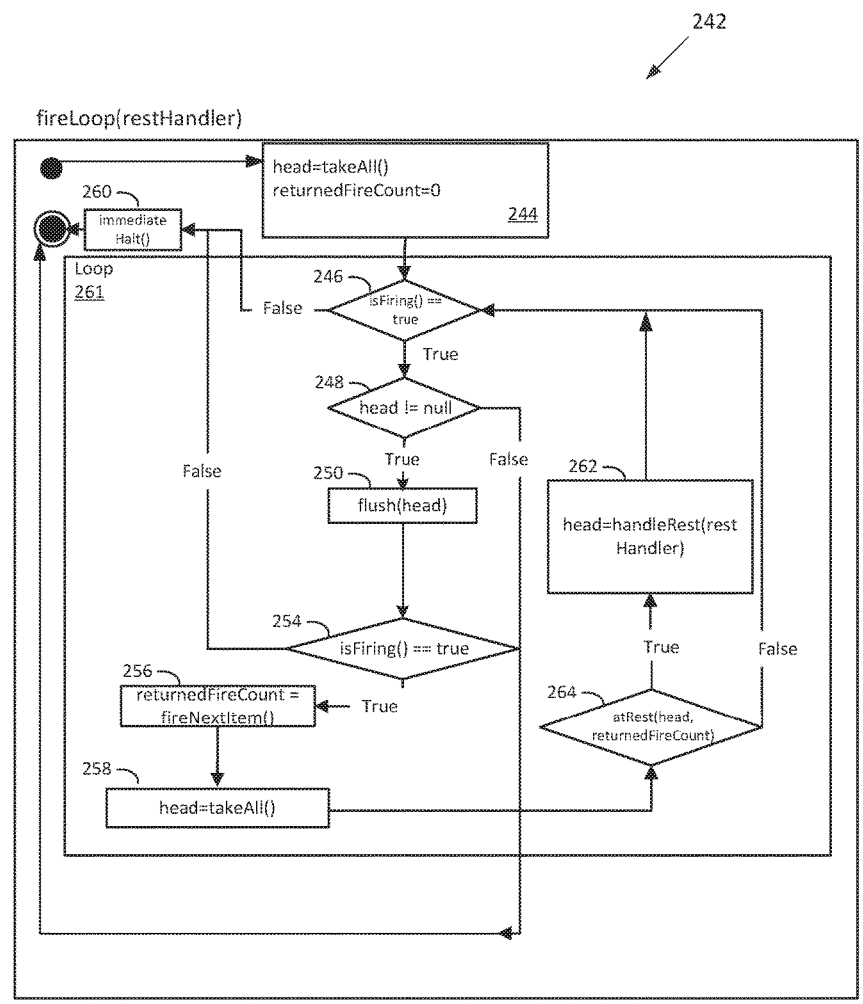
Figure 2E:
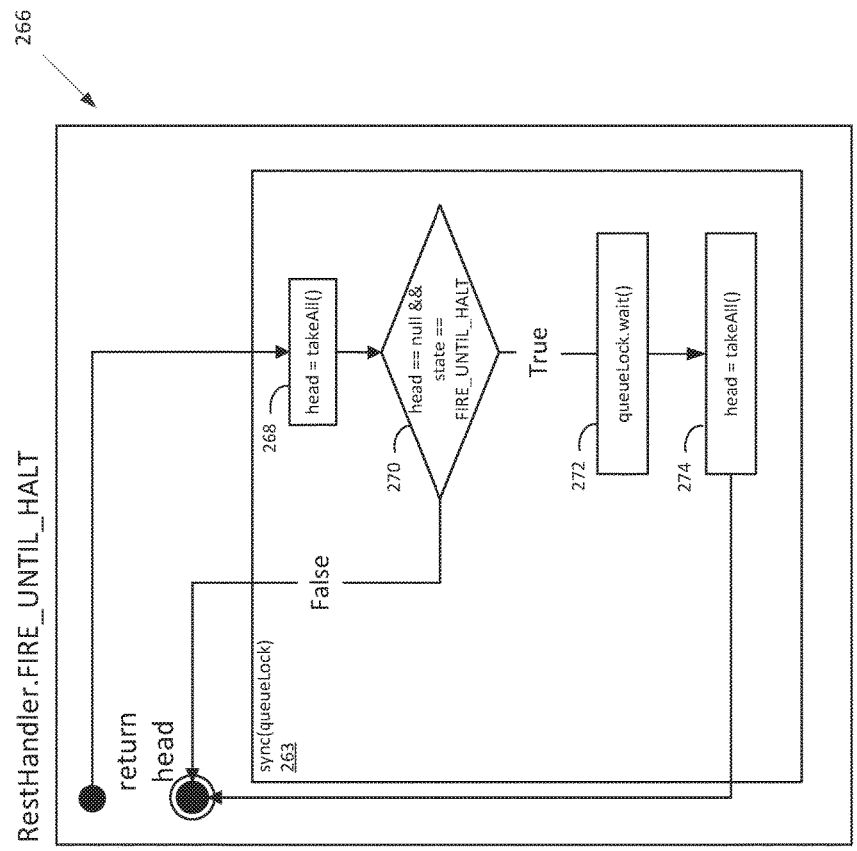
Figure 2F:
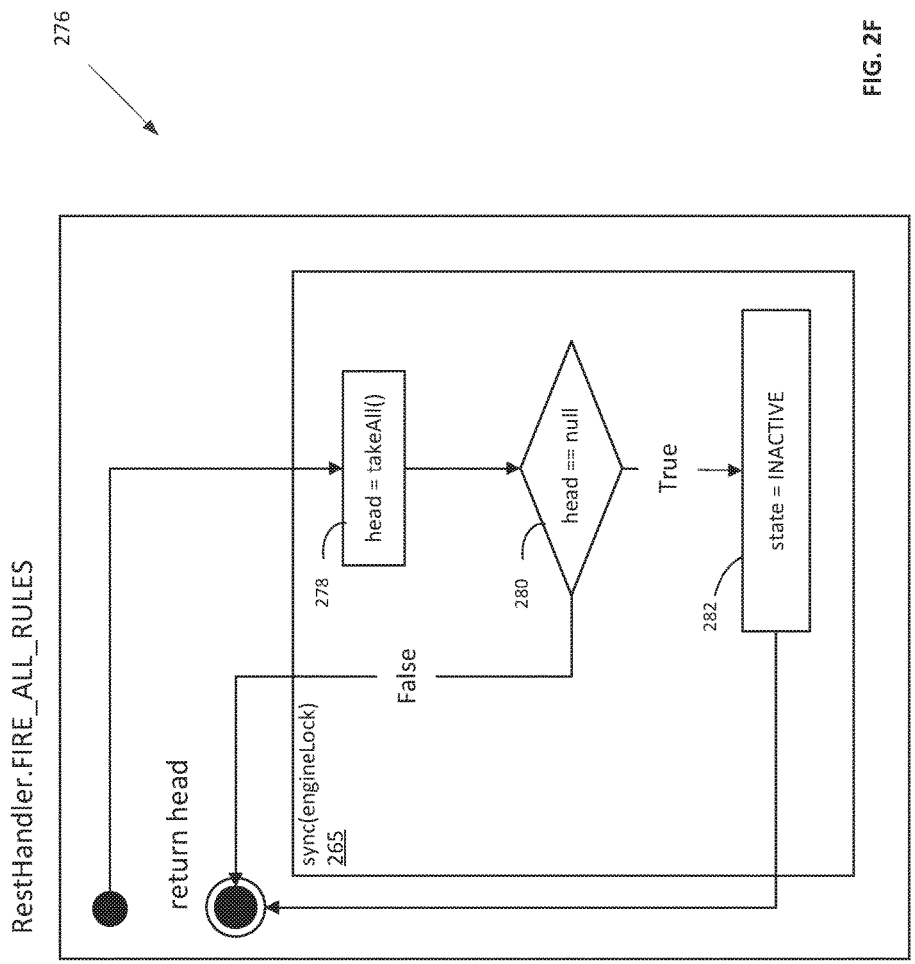
Figure 2G:
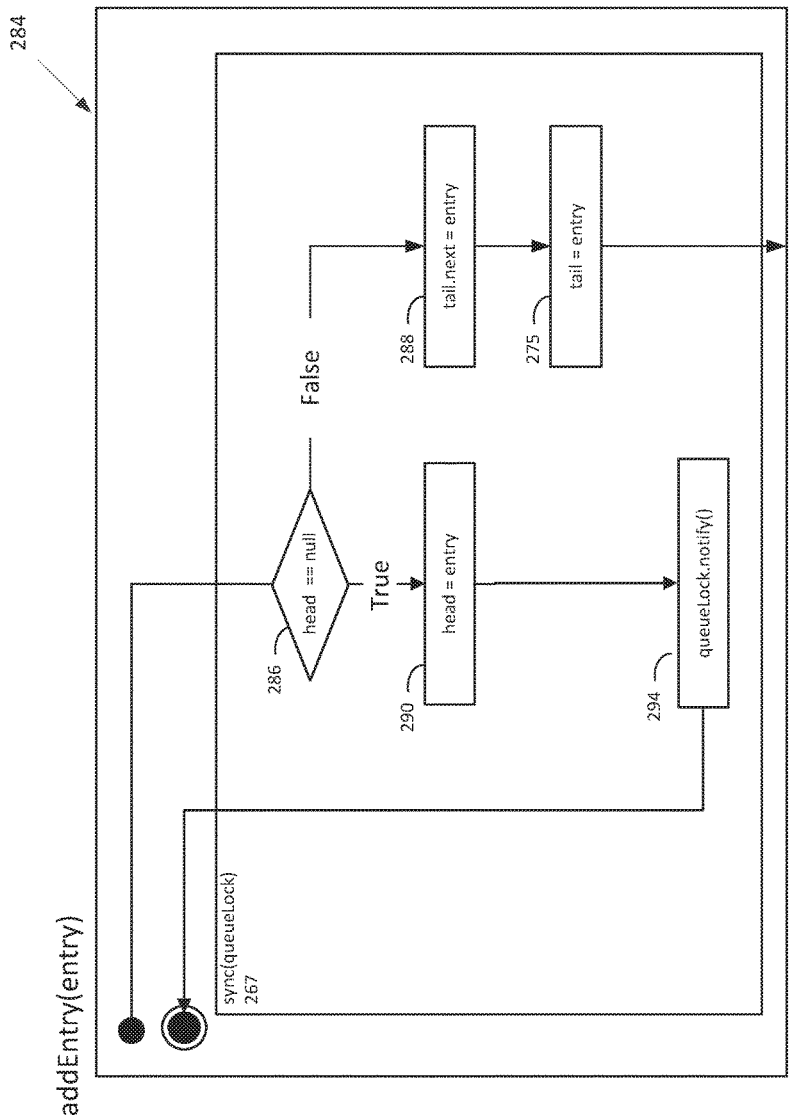
Figure 2H:
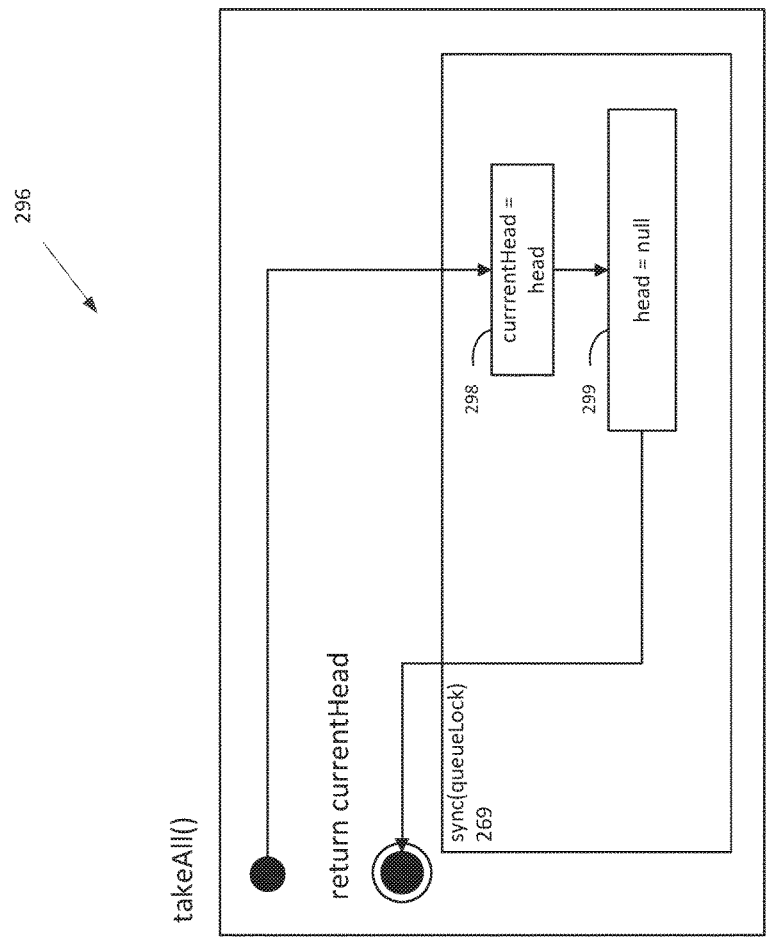
Figure 2I:
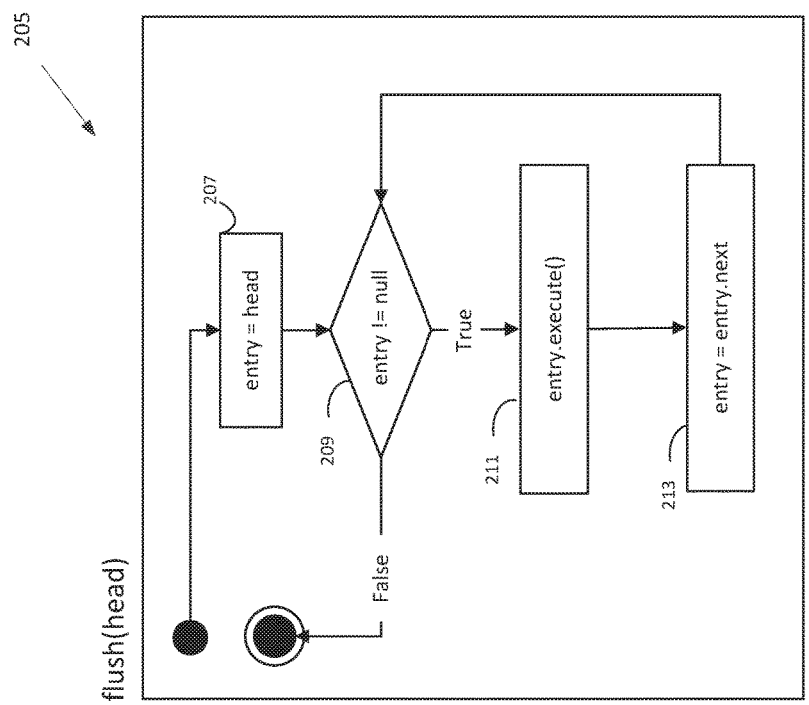
Figure 2J:
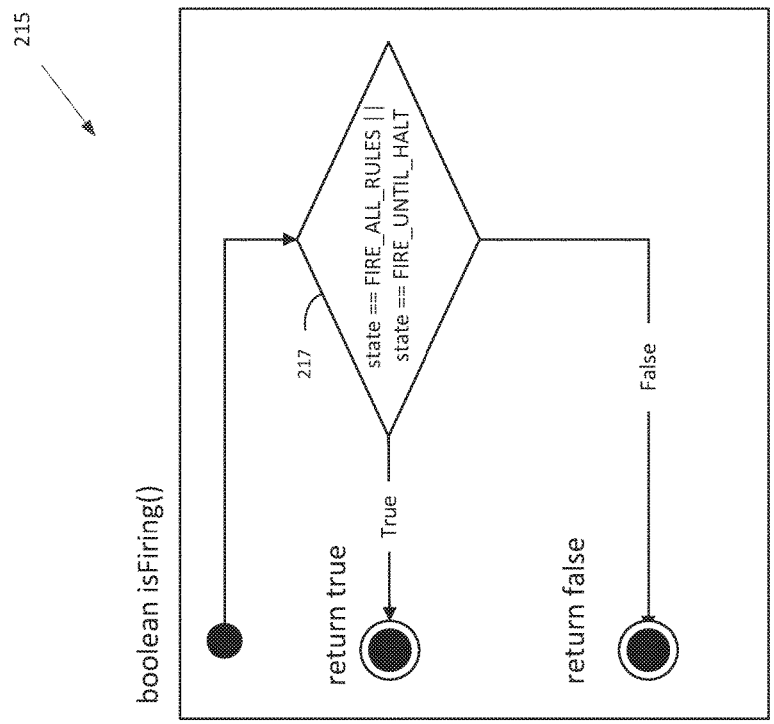
Figure 2K:
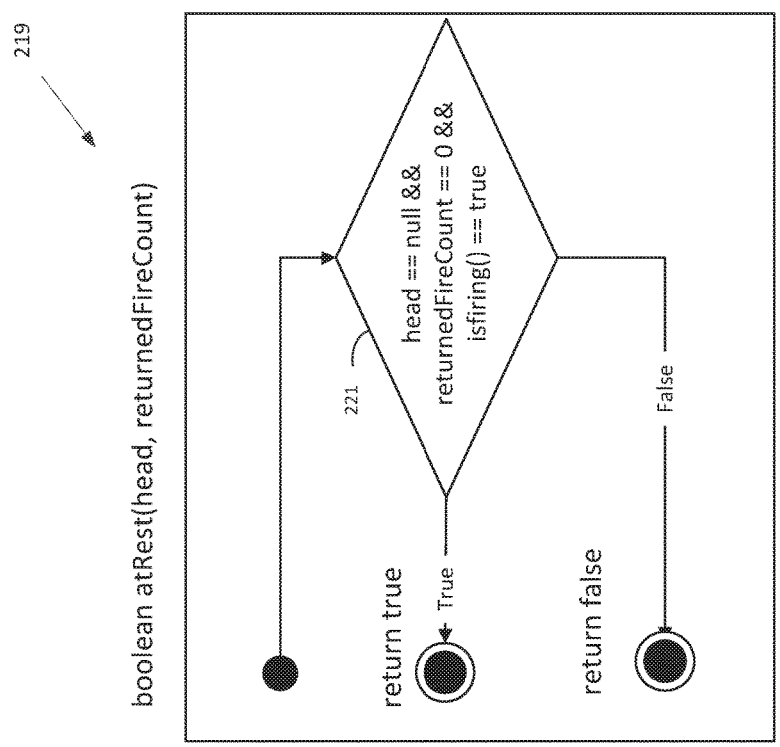
Figure 2L:
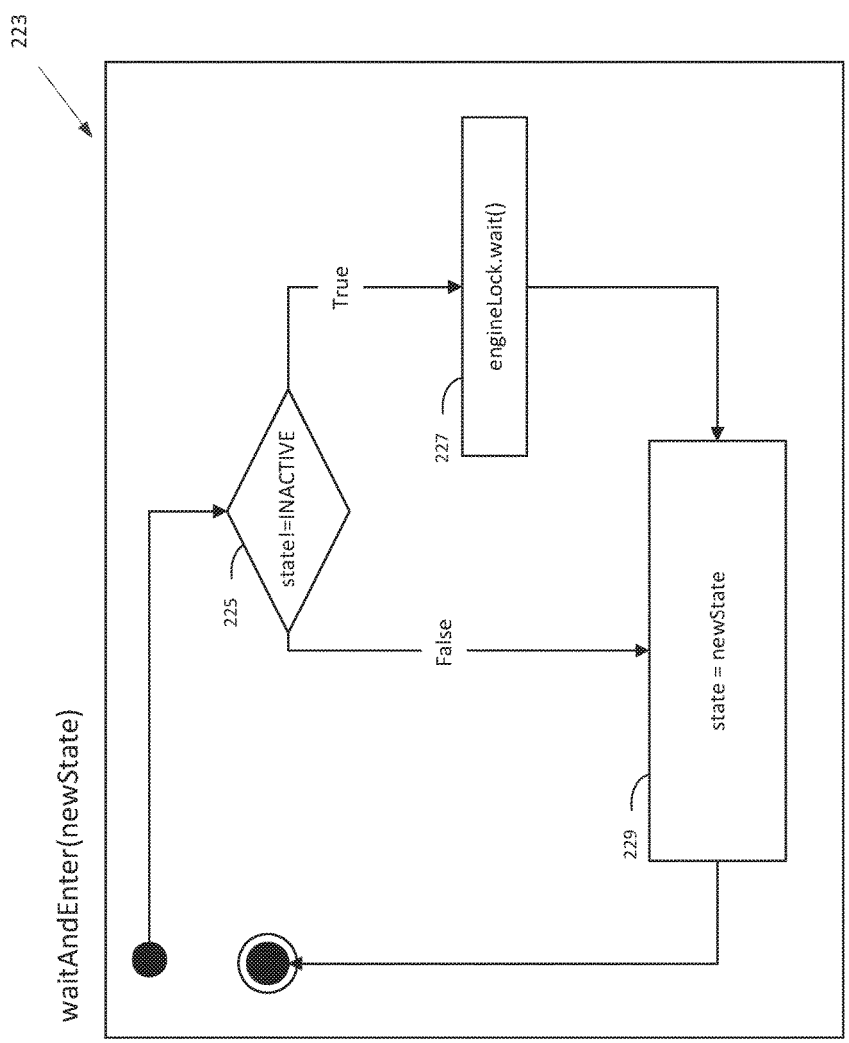

When a thread wants the rule engine to transition into the FIRE_ALL_RULES state 214, FIRE_UNTIL_HALT state 220, or EXECUTE_TASK state 202 (from an INACTIVE state 206 or from another state), the thread may enter into a waitAndEnterExecutionState (which is described herein with respect to FIG. 2L). If the rule engine is in an INACTIVE state 206, the thread may force the rule engine to transition into a desired state without any delay because when the rule engine is in an INACTIVE state 206, the rule engine is at rest and no commands are being executed. If the rule engine is not in an INACTIVE state 206 and is in another state (and is being utilized by another thread), the thread may wait in the waitAndEnterExecutionState until the other thread finishes using the rule engine and the rule engine returns back to the INACTIVE state 206.

If the rule engine is currently running and is not in a rest or INACTIVE state 206, then the fireAllRules( ) 208 method or the fireAllRules 210 method has been previously called to enter either the FIRE_ALL_RULES state 214 or FIRE_UNTIL_HALT state 220. If fireAllRules( ) is called again by a thread while the rule engine is in the FIRE_ALL_RULES state 214 or FIRE_UNTIL_HALT state 220, the state machine may force the thread to exit because fireAllRules( ) is still running. The state machine may hold synchronization points for a period of time such that the thread may either exit or make a desired transition.

Once the rule engine goes into the FIRE_ALL_RULES state 214, the state machine may release the synchronization point. The synchronization point may stop other threads from interfering with the propagation queue and the thread using the rule engine.

Once the rule engine enters the executeTask 204 state, asynchronous operations may occur (for example, a task/command submitted by a timer thread) in an optimized manner. If the rule engine is already running when executeTask is called (due to fireAllRules( ) 208 or fireUntilHalt( ) 210 being called, for example), the task may be appended to the queue and the current thread running on the rule engine (i.e., the third thread 122) executes the task in the queue. If the rule engine is not currently running when executeTask is called, the rule engine enters the EXECUTE_TASK state 202 and executes the task using the current thread (i.e., either the second thread 120 or the third thread 122).

In FIGS. 2B-2O, a shaded dot and a shaded dot with a circle around it are shown. The shaded dot is a start (where a method starts) and the shaded dot with a circle surrounding the dot is an end (where the method ends).

FIGS. 2B-2O illustrate flowcharts of various methods used by the state machine while in particular states and to transition between states, in accordance with embodiments. FIGS. 2B-2O may be methods used by the state machine described in FIG. 2A. These methods may be performed by processing logic that may comprise hardware (e.g., circuitry, dedicated logic, programmable logic, microcode, etc.), software (such as instructions run on a processing device), firmware, or a combination thereof. In one implementation, the methods may be performed by the multi-threaded rule engine 115 of FIG. 1.

FIG. 2B illustrates details regarding a fireAllRules( ) 208 method. Referring again to FIG. 2A, the fireAllRules( ) 208 method is called when the state machine transitions from the INACTIVE state 206 to the FIRE_ALL_RULES state 214. The method starts at decision block 228, where it is determined whether isFiring( ) is equal to true. Decision block 228 uses isFiring( )==true to determine a current state of the state machine. Specifically, isFiring( ) true is used to determine whether the rule engine is currently firing a rule (i.e., is in a firing state). If isFiring( ) is equal to true (and the decision block 228 returns true), the rule engine is currently firing a rule so the fireAllRules( ) 208 method may not be called. IsFiring( )==true may return true when the Fire_All_Rules state 214 or the Fire_Until_Halt state 220 is being called. The method then exits if the rule engine (and the state machine) is currently in the Fire_All_Rules state 214 or the Fire_Until_Halt state 220, and the fireAllRules( ) 208 method may not be called. Thus, commands may not be entered when the rule engine is currently firing a rule. In an embodiment, the commands may be ignored, as the method ends in response to determining that isFiring( )==true returns true.

If isFiring( )==true is false (and the decision block 228 returns false), the rule engine is not currently firing a rule and the fireAllRules( ) 208 method may be called. The method continues to waitAndEnter (FIRE_ALL_RULES) in block 230. The waitAndEnter (FIRE_ALL_RULES) in block 230 is a rule engine synchronization point in embodiments. When a thread executes the rule engine and triggers execution of a rule (and when the state machine is in a FIRE_ALL_RULES state), the waitAndEnter method may be called. If the state of the state machine at the time when the waitAndEnter method is called is INACTIVE, a state transition is made from INACTIVE to a different state as determined by the thread that is being executed and the thread controls the state of the state machine. If the state of the state machine at the time when the waitAndEnter method is called is not INACTIVE, then another thread executes the rule engine. The thread requesting access to the rule engine core and execution by the rule engine has to wait until the other thread is finished executing. Therefore, the requesting thread waits until the other thread finishes. When the other thread finishes, the state of the state machine is placed into an INACTIVE state and the requesting thread is notified. When the notification is sent to the requesting thread, the requesting thread may then place the state machine in an appropriate state so that the requesting thread can access the rule engine core.

Referring again to block 230, it is determined whether a synchronization point is to be placed (based on the state of the state machine) on a command. Additional details regarding the waitAndEnter method are described herein with respect to FIG. 2L. The method continues to fireLoop (RestHandler.FIRE_ALL_RULES) in block 232 and then exits. Details regarding the fireLoop method are described herein with respect to FIG. 2D. In an embodiment, the fireLoop( ) method may be generic and used by both fireAllRules( ) 208 and fireUntilHalt( ) 210 methods. RestHandler may be used to handle logic when the rule engine comes to a rest point. Specifically, RestHandler may be used at an end of the FireLoop method to put the rule engine to rest. RestHandler may use a strategy pattern to perform two different sets of operations (one operation for the FIRE_ALL_RULES state and another operation for the FIRE_UNTIL_HALT state). Details regarding the RestHandler method are described herein with respect to FIG. 2E.

The sync(engineLock) 226 is shown around decision block 228 and block 230. The sync(engineLock) blocks shown in the figures (including FIG. 2B and other figures described herein) may be used to read an actual value of the state machine. A sync(engineLock) or synchronization point may be called whenever a state of the state machine is to be determined (or the state is to be read) or the state is to be changed. In an embodiment, when a read or write to the state machine is to be performed, the read or write is performed by calling a synchronization point. A synchronization point is a lock. The sync(engineLock) is a synchronization point, which, when set, locks out other threads so that one thread can execute the rule engine at one time.

FIG. 2C illustrates details regarding a fireUntilHalt( ) 210 method. Referring again to FIG. 2A, the fireUntilHalt( ) 210 method is called when the state machine transitions from the INACTIVE state 206 to the FIRE_UNTIL_HALT state 220. The method starts at decision block 236 where it is determined if a state of the state machine is in a FIRE_UNTIL_HALT state. If the state is a FIRE_UNTIL_HALT state (and the decision block 236 returns true), the method exits because fireUntilHalt( ) may not be called while the state machine is in a FIRE_UNTIL_HALT state. If the state is not a FIRE_UNTIL_HALT state, the state of the state machine may be a FIRE_ALL_RULES state, for example. If the state is not a FIRE_UNTIL_HALT state, (and the decision block 236 returns false), the method continues to waitAndEnter(FIRE_UNTIL_HALT) in block 238. In block 238, it is determined whether a synchronization point is to placed (based on the state of the state machine) on a command. Details regarding the waitAndEnter method are described herein with respect to FIG. 2L. The method then continues to fireLoop(RestHandler.FIRE_UNTIL_HALT in block 240 and then the method exits. Details regarding the waitAndEnter and fireLoop methods are described herein with respect to FIGS. 2L and 2D, respectively.

The sync(engineLock) 234 is shown around decision block 236 and block 238. In an embodiment, the fireUntilHalt( ) 210 method may place a lock on the rule engine because a takeAll as well as a null check and a wait operation may be performed (described herein with respect to FIG. 2D). A takeAll may take all entries or tasks from the propagation queue that have not yet been processed. These may be performed atomically. In alternative systems, if a null check is not at a synchronization point, another potential gap may have been experienced. In the current embodiment, the potential gap may be avoided.

In an implementation, if the state machine 128 was not used in controlling the modes/states of the rule engine core 124, gaps may develop. A gap occurs when a transition is made from one state to another state and, during the transition, some data (e.g., a command to perform an action) is not processed before the transition occurs. By using the state machine 128, gaps do not occur during the processing of data by the rule engine core 124.

FIG. 2D illustrates details regarding a fireLoop(restHandler) 242 method. The fireLoop(restHandler) 242 method may be called after a waitAndEnter method is called. The fireLoop(restHandler) 242 method may be executed by the fireUntilHalt method or the fireAllRules method to flush out all the actions which are enqueued on the propagation queue and fire rules that have been activated by these actions. The fireAllRules and the fireUntilHalt methods each pass a different restHandler when each invokes the fireLoop method because different respective operations are to be performed to put the rule engine to rest after termination of a respective method. The fireLoop(restHandler) 242 method may be used to append actions on the queue while the rule engine core is accessed. As shown in FIGS. 2B and 2C, the fireLoop(restHandler) method may be used by both the fireAllRules( )method and the fireUntilHalt( )method. In an embodiment, the fireLoop(restHandler) method used by the fireAllRules( )method returns a different callback than the fireLoop(restHandler) method used by the fireUntilHalt( )method. Referring again to FIG. 2D, the method starts at block 244 where head=takeAll( ) and returnedFireCount=0. Block 244 may initiate the fireLoop(restHandler) 242 method. A head is a first entry or task in a propagation queue. The head may be a first entry and other entries may or may not be included after the head entry (depending on whether the propagation queue includes additional entries following the head entry). The head=takeAll( ) sets the head to take all of the entries (e.g., actions/commands) from the propagation queue. In the embodiments described herein, when the head=takeAll( )method is called, the head is set to take all of the entries from the propagation queue.

The returnedFireCount=0 sets a number of rules that have been fired during a loop as zero in order to test if during the loop 261, the state machine is fired or not. The method continues to decision block 246 where it is determined whether isFiring( )==true (that is, if the rule engine is currently firing a rule). If isFiring( )==true returns true, the method immediately halts and goes into an immediate halt( )method, as shown in block 260, and the method exits. In an embodiment, isFiring( )==true may return false when a user has issued a halt command while the fireLoop (restHandler) 242 method is being performed. If a user issues a halt command, the method is directed to an immediateHalt( ), as shown in block 260. Details regarding the immediate halt( )method are described herein with respect to FIG. 2M.

If in decision block 246, isFiring( )==true returns false, then the method continues to decision block 248. At decision block 248, it is determined whether the head is not equal to null (head!=null). As used herein, !=refers to "not equal to." If head!=null returns false, there is nothing in the propagation queue to be processed and the method exits. If head!=null returns true, at least one entry is included in the propagation queue (i.e., at least the head entry is within the propagation queue which is not null or empty, where the head entry may be executed), and the method continues to block 250 where the head is flushed by flush(head). Details regarding the flush(head) method are described herein with respect to FIG. 2I. The flush(head) method may generally flush the head (which is the first entry in the propagation queue) as well as any other entries, besides the head entry, included in the propagation queue. Flushing refers to the engine thread executing and clearing out all commands placed on the queue (when the engine thread accesses the rule engine core). After flushing of the head (and any other entries that may be included in the propagation queue) is performed, the method continues to block 254 where it is determined whether isFiring( )==true (that is, if the rule engine is currently firing a rule). If isFiring( )==true returns false (and the decision block 254 returns false), the method immediately halts and goes into an immediate halt( ) as shown in block 260, and the method exits. If isFiring( )==true returns true (and the decision block 254 returns true), the method continues to block 256 where returnedFireCount=fireNextItem( ). The returnedFireCount is set to the fireNextItem, that is the next item that is to be fired up/executed. The method continues to block 258 where head=takeAll( ) similar to the first part of the initialization that is performed in block 244. The method continues to decision block 264 where it is determined whether atRest (head, returnedFireCount) returns true or false. The atRest (head, returnedFireCount) method determines the conditions of three variables as described below with respect to FIG. 2K. The atRest(head, returnedFireCount) method determines whether head==null and returnedFireCount==0 and isfiring( )==true. If all three of these conditions are true, then the atRest(head, returnedFireCount) method returns true. If one or more of these conditions are false, then atRest(head, returnedFireCount) method returns false. If the atRest(head, returnedFireCount) method returns true, then the rule engine core is "at rest" which means that the rule engine is not executing any commands and is not processing the queue because the queue is empty. There are also no rules being fired when the rule engine core is at rest. Referring again to FIG. 2D, if the decision block 264 returns true, the state machine is at rest and the method continues to block 262 where head=handleRest(restHandler), the state machine is at rest and no additional tasks or entries are being fired from the propagation queue (no firing is being performed) and the method returns back to decision block 246. In an embodiment, after the method goes from block 262 to 246, the state machine is in a halt state and a decision is made whether isFiring( )==true. After returning from block 262, the condition in decision block 246 may be false because the state machine is in a halt state and thus, the state machine may not be firing, which causes the method to enter immediateHalt( ) in block 260. If the decision block 264 returns false, the state machine is not at rest, the method loops back to decision block 246.

Loop 261 in FIG. 2D depicts a loop that may continue to check decision block 264 and decision block 246. Until decision block 246 returns false (that is, until isFiring( )==true is false), the loop continues.

Details regarding the restHandler method in block 262 are described herein with respect to FIGS. 2E and 2F. In FIG. 2E, details regarding the restHandler method with respect to the FIRE_UNTIL_HALT state are described whereas in FIG. 2F, details regarding the restHandler method with respect to the FIRE_ALL_RULES state are described.

FIG. 2E illustrates details regarding a RestHandler. FIRE_UNTIL_HALT 266 method. The RestHandler.FIRE_UNTIL_HALT 266 method is to be executed to place the rule engine at rest after the rule engine is in a FIRE_UNTIL_HALT state. Referring again to FIG. 2C, the RestHandler.FIRE_UNTIL_HALT 266 method is used in block 240 to determine whether the head of the queue is null and the state of the state machine is FIRE_UNTIL_HALT. If so, a lock may be placed on the queue. The method starts at block 268 where head=takeAll( ). The method continues to decision block 270 where it is determined whether head==null and whether the state (of the state diagram)==FIRE_UNTIL_HALT. The decision block 270 determines whether the head is empty (null) and whether the state is the FIRE_UNTIL_HALT state. If head==null and state==FIRE_UNTIL_HALT (and the decision block 270 returns true, that is, both of these conditions have been met), the method continues to block 272 and enters into a method called queueLock.wait( ). The queueLock.wait( ) may be a lock on the propagation queue. When a lock is placed on the propagation queue, the threads may temporarily be denied access the queue and may not add actions to the queue. When a new entry is added onto the propagation queue, the entry may wait and a notification may be provided to wake up the propagation queue. The state machine (and rule engine) may be in a FIRE_UNTIL_HALT state and wait for additional entries that may have been added onto the propagation queue. The method continues to block 274 where head=takeAll( ). The method then exits.

If the head==null or state==FIRE_UNTIL_HALT returns false in decision block 270, the head is returned and the method exits. The sync(engineLock) 263 is shown around blocks 268, 272, 274 and decision block 270. In FIG. 2E, a thread (a user thread, an engine thread, or a timer thread) that enters the method may sleep the thread is notified to wake up.

FIG. 2F illustrates details regarding a RestHandler. FIRE_ALL_RULES 276 method. The RestHandler.FIRE_ALL_RULES 276 method 276 is executed to place the rule engine at rest after the rule engine is in a FIRE_ALL_RULES state Referring again to FIG. 2B, the RestHandler.FIRE_ALL_RULES 276 method is used in block 232 to determine whether the head of the queue is null (empty) or not. The method starts at block 278 where head=takeAll( ) The method continues to decision block 280 where it is determined whether head==null. If head==null and the head is empty (and the decision block 280 returns true), the method continues to block 282 where the state is INACTIVE (state=INACTIVE). In an embodiment, if there is nothing in the propagation queue (and the head is empty), the state machine is an INACTIVE state. The method then exits. If in decision block 280 it is determined that the head==null is false (and the decision block 280 returns false), the head is returned and the method exits. The sync(engineLock) 265 is shown around blocks 278, 282 and decision block 280.

FIG. 2G illustrates details a regarding addEntry(entry) 284 method. The addEntry(entry) 284 method may be called by a thread when an action is to be added on the propagation queue and the queue determines where the action (or the entry) is to be placed on the queue. If the propagation queue includes entries before the new entry is added, then the propagation queue is not empty (as it includes other existing entries), and therefore, the head of the propagation queue includes a command (and is thus not null). In an embodiment, the term entry refers to an entry that is added onto (or is already existing within) the propagation queue. The terms entry, task, action, command, and job may be used to refer to items to be added (or already existing) on the propagation queue. In an embodiment, new entries may be added to the propagation queue in a first come, first serve order or a different order. The method starts at decision block 286 where it is determined whether head==null. If head==null and the propagation queue is empty, the method continues to block 290 where head=entry. The head is set to the newly added entry. The method continues to block 294 where queueLock.notify( ) (and a notification is issued for a lock) and the method exits.

In response to determining that head==null returns false (where the decision block 286 returns false), the method continues to block 288 where tail.next=entry. That is, if the propagation queue is not empty (and head==null returns false), the tail points to the entry and the entry is added as a tail, as shown in block 275 (tail=entry) and the method exits. In an embodiment, as the propagation queue (and head) is not empty, a thread is already running and therefore, no notification is issued. In block 294, a notification may be issued to wake up the rule engine as the propagation queue (and the head is empty) and no threads are currently running.

The sync(engineLock) 267 is shown around blocks 290, 288, 275, 294 and decision block 286. In an embodiment, the notification in block 294 may wake up the queueLock.wait( ) used by RestHandler.FIRE_UNTIL_HALT (in block 272 of FIG. 2E).

FIG. 2H illustrates details regarding a takeAll( ) 296 method. A takeAll( ) 296 method may be called by a thread or by a method to take all entries or tasks from the propagation queue that have not yet been processed. For example, referring again to FIG. 2D, a takeAll( )method may be called in block 244. The method starts at block 298 where currentHead=head. Therefore, the current head is returned from block 298. The method continues to block 299 where head=null. The head is flushed or emptied (i.e., set to null). The method then returns current head and exits. The sync (engineLock) 269 is shown around blocks 298 and 299.

FIG. 2I illustrates details regarding a flush(head) 205 method. A flush(head) 205 method may be called in order for the engine thread to execute and clear out all commands placed on the queue (when the engine thread accesses the rule engine core). For example, referring again to FIG. 2D, a flush(head) method may be called in block 250. The method starts at block 207 where entry=head (the entry is set to head). The method continues to decision block 209 where it is determined whether entry!=null. If entry entry!=null is true (and the decision block 209 returns true), the method continues to block 211, entry.execute( ) where the entry may be executed. When an entry is executed (or an action or a command is executed), the entry is processed using a rule network of the rule engine. The method continues to block 213 where entry=entry.next and the entry may include a pointer to a next entry. The method then loops back to decision block 209. If entry!=null is false and there are no more entries left on the propagation queue (and the decision block 209 returns false), the method exits. In the depicted embodiment, each entry may be executed until no more entries are left in the propagation queue. Therefore, the flush(head) method may deplete all of the entries no the propagation queue.

FIG. 2J illustrates details regarding a Boolean isFiring( ) 215 method. The Boolean isFiring( ) 215 method may be invoked to check whether the rule engine is firing or not (whether the state is in a FIRE_ALL_RULES or FIRE_UNTIL_HALT state. The method starts at decision block 217 where it is determined whether state==FIRE_ALL_RULES or state FIRE_UNTIL_HALT. In response to determining state==FIRE_ALL_RULES or state FIRE_UNTIL_HALT is true (and the decision block 217 returns true), the method returns true and exits. In response to determining that state==FIRE_ALL_RULES or state=FIRE_UNTIL_HALT is false (and the decision block 217 returns false), the method returns false and exits.

FIG. 2K illustrates details regarding a Boolean atRest (head, returnedFireCount) 219 method. The Boolean atRest (head, returnedFireCount) 219 method may be used to check certain conditions (whether head==null, returnedFireCount==0, and whether isfiring( )==true). In an embodiment, the Boolean atRest(head, returnedFireCount) 219 method may be used by the decision block 264 in FIG. 2D. The method starts at decision block 221 where it is determined whether head==null, returnedFireCount==0, and isFiring( )==true (that is, if the rule engine is currently firing a rule). If all three of these conditions are true (and the decision block 221 returns true), the method returns true and exits. If any one of these conditions are not true (and the decision block 221 returns false), the method returns false and exits.

FIG. 2L illustrates details regarding a waitAndEnter(newState) 223 method. As described above with respect to FIG. 2B, the waitAndEnter method is called when a thread executing the rule engine triggers execution of a rule (when the state machine is in a particular state). The thread may wait for another thread to finish executing before causing the rule engine to enter into a new state if the state of the state machine is not INACTIVE. If the state of the state machine is INACTIVE, the thread may not wait before transitioning the state machine from the INACTIVE state to another state. The waitAndEnter(newState) 223 method is called when the state machine is to transition to a new state. A new state may be a state that is different than a current state of the state machine. The method begins at decision block 225 where it is determined whether state!=INACTIVE state. If state!=INACTIVE (and the decision block 225 returns true), the method continues to block 227, and enters into an engineLock.wait( ). The state may be in a non-inactive state such as an execution state, for example. The method continues to block 229 where the state is set to equal a newState (state=newState) and the method ends. The newState may be a new state that is different than a current state of the state machine. For example, if a state is a FIRE_UNTIL_HALT state 220, the state may be set as the newState (i.e., the FIRE_UNTIL_HALT state 220).

If the state!=INACTIVE returns false (and the decision block 225 returns false), the method continues to block 229. In an embodiment, a thread that enters waitAndEnter(newState) may sleep until an immediateHalt is called, which may call the engineLock.notify. This method may be called from inside of a sync(engineLock) block.

Figure 2M:
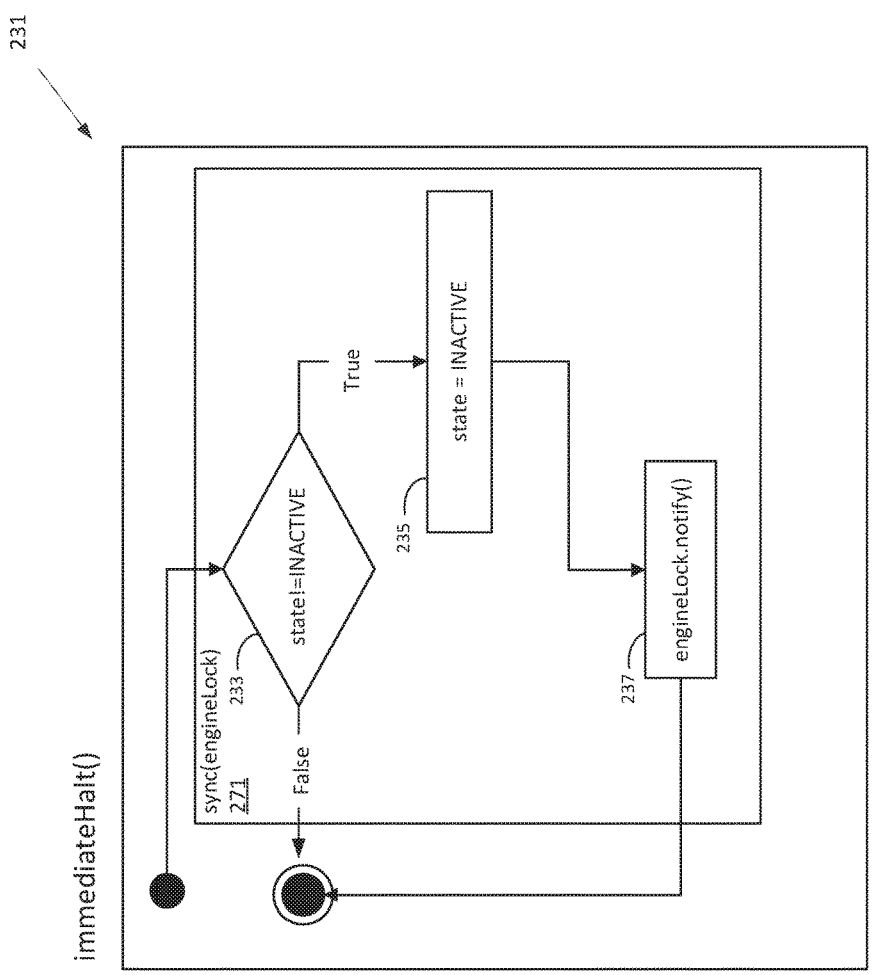

FIG. 2M illustrates details regarding an immediateHalt( ) 231 method. The immediateHalt( ) 231 method may be called to immediately halt the state machine and place the state of the state machine as an INACTIVE state. For example, referring again to FIG. 2D, the immediateHalt( )method may be called in block 260. The method begins at decision block 233 where it is determined whether state!=INACTIVE. In response to determining that state!=INACTIVE is true (and the decision block 233 returns true), the method continues to block 235. At block 235, the state is set to INACTIVE. The method continues to block 237, where engineLock.notify( ) is called and the rule engine is notified. The method then exits.

In response determining that the state!=INACTIVE returns false (and the decision block 233 returns false), the method ends. The sync(engineLock) 271 is shown around decision block 233 blocks 235 and 237.

Figure 2N:
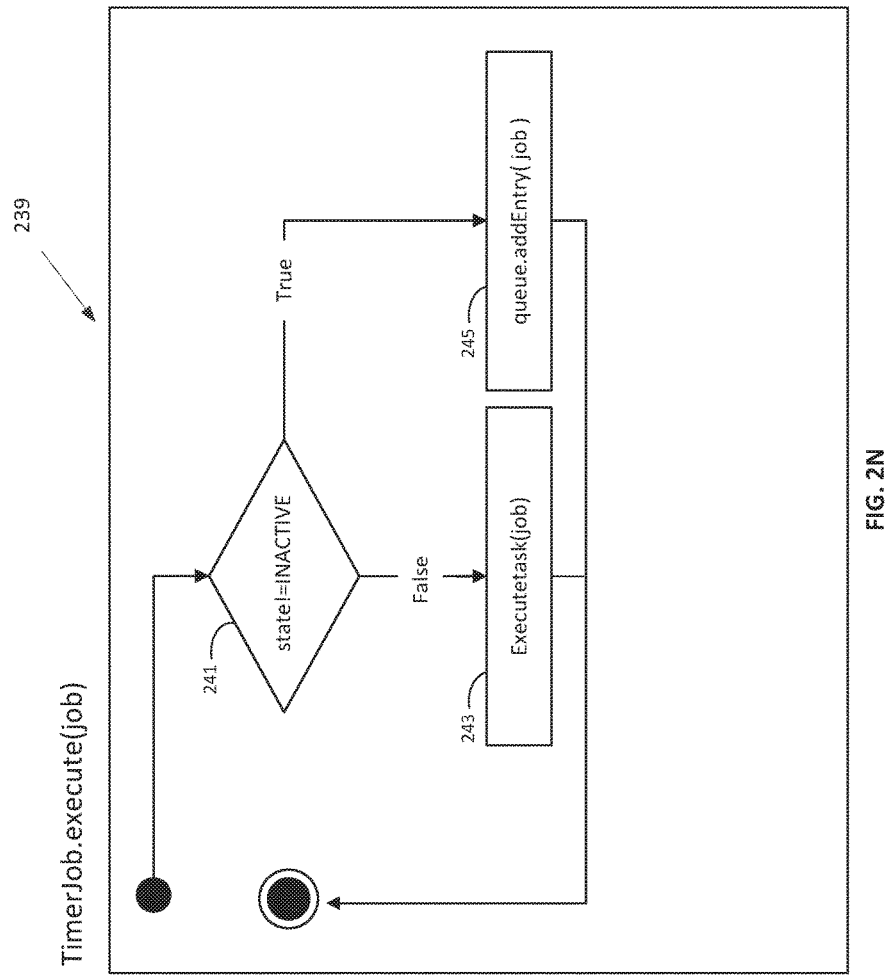
Figure 20:
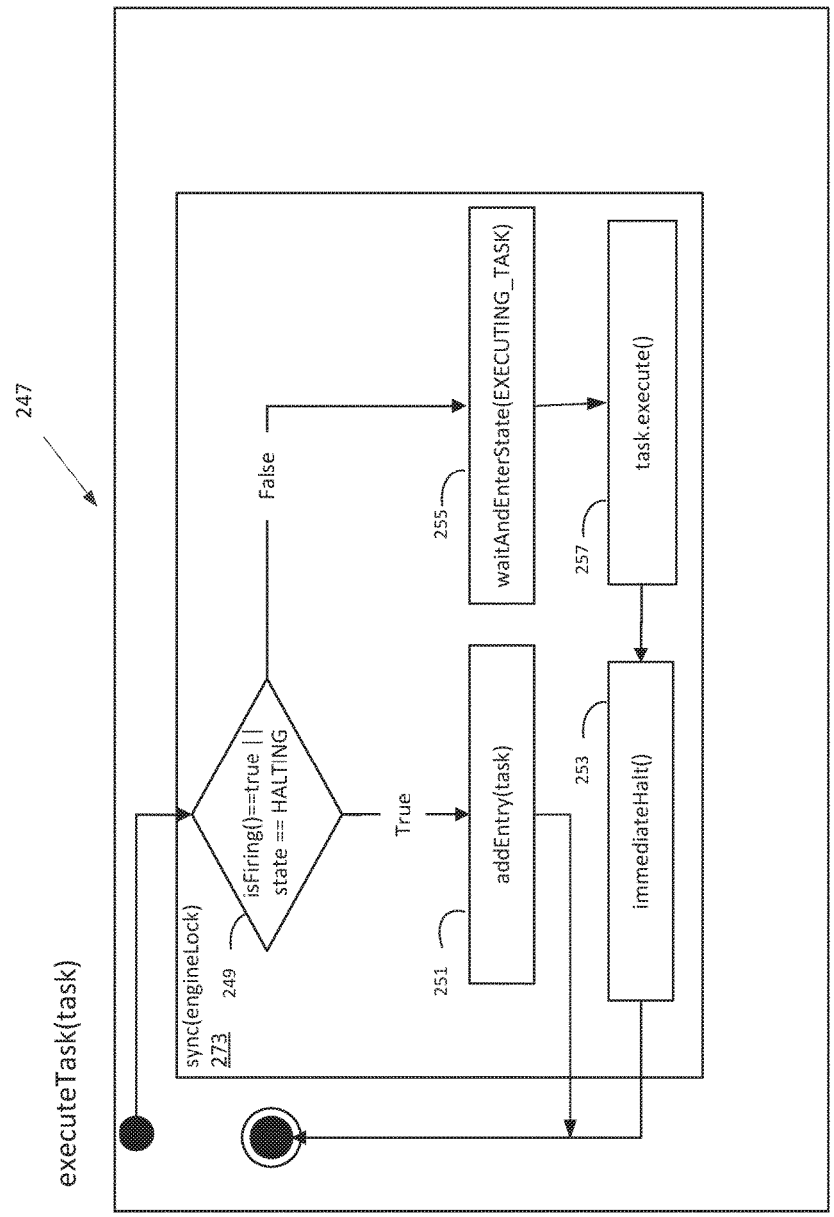

FIG. 2N illustrates details regarding a TimerJob.execute (job) 239 method. The TimerJob.execute(job) 239 method may be called by the timer thread to asynchronously execute a task triggered by the timer thread. The method begins at decision block 241 where it is determined whether state!=INACTIVE state. In response to determining that state!=INACTIVE returns false (and the decision block 241 returns false), the method continues to block 243. At block 243, Executetask(job) is called and an entry of the propagation queue is executed. Details regarding the execution of a task are described herein with respect to FIG. 2O. In an embodiment, the timer thread may execute (or flush) the entry in the propagation queue by becoming an engine thread. The method then ends.

In response to determining that the state!=INACTIVE (for example, the rule engine is firing and not in an INACTIVE state and the decision block 241 returns false), the method continues to block 245. At block 245, queue.addEntry(job) is called and the entry may be added to the propagation queue (because the engine thread is already flushing or executing the propagation queue). The method then ends. TimerJob.execute(job) may wake up any thread that is currently waiting in the waitAndEnter method.

FIG. 2O illustrates details regarding an executeTask(task) 247 method. The executeTask(task) 247 method is used for executing a command issued by a thread. Referring again to FIG. 2A, the executeTask 204 method is called when the state machine transitions from the INACTIVE state 206 to the EXECUTE_TASK state 202. The method begins at decision block 249 where it is determined whether isFiring( )==true (that is, if the rule engine is currently firing a rule) or if state==HALTING (that is, if the rule engine is currently in a HALTING state). If either isFiring( )==true or if state==HALTING (or both of these conditions are true) and the decision block 249 returns true, the method continues to block 251. At block 251, addEntry(task) is called and the task is added to the propagation queue and the propagation queue may flushed immediately. The method then ends.

If isFiring( )==true is false or state==HALTING is false and the decision block 249 returns false, the method continues to block 255, where waitAndEnterState(EXECUTING_TASK) is called. The method continues to block 257 where task.execute( ) is called. The method then continues to block 253 where immediateHalt( ) is called. In an embodiment, if the rule engine is already firing, the task may enter into the waitAndEnterState, and then the task is executed and may enter into the immediateHalt( ) method. The method then ends.

The sync(engineLock) 234 is shown around decision block 249 and blocks 251, 255, 253, and 257. By calling executeTask(task), a thread may submit a task/command to the queue to be executed by the current running thread while the engine is firing or halting (but has not yet halted). Otherwise, the thread may execute the task with the current thread (e.g., such as a timer thread). In an embodiment, the executeTask(task) method has the engine locked at a same time as the queue is locked (on the addEntry).

In an embodiment, the FIRE_ALL_RULES state is referred to as a passive state and the FIRE_UNTIL_HALT state is referred to as a reactive state.

Referring again to FIG. 1, any of the first thread 118, the second thread 120, or the third thread 122 may issue actions that are enqueued onto the queue 126 as entries (e.g., commands). Although any of these threads may append actions onto the queue 126, the third thread 122 may be responsible to execute or flush the queue 126 (which may include multiple commands). The second thread 120 may not be able to flush an entire queue. In some embodiments, the second thread 120, although not able to flush the queue 126 when the queue 126 contains additional entries, may execute a command that it adds to the queue 126. The second thread 120 may determine if the rule engine core 124 is accessed by the third thread 122. If so, the second thread 120 may place an action onto the queue 126 for the third thread 122 to execute. If the rule engine core 124 is in an inactive state, the second thread 120 may execute the action by itself (by accessing the rule engine core 124) without having to queue up the action with others in the queue 126. For example, the queue 126 may hold one action issued by the second thread 120, and no others. The second thread 120 may not completely execute or flush the entirety of the queue 126, whereas the third thread 122 may be able to flush the entire queue 126.

In an embodiment, the third thread 122 and the second thread 120 may propagate one or more facts or objects associated with entries in the queue 126 through an entire network (such as a Rete network) using the rule engine core 124. The entire network may include two sub-networks called an alpha network and a beta network. The third thread 122 and the second thread 120 may propagate facts or objects through both the alpha network and the beta network. The first thread 118 may place actions onto the queue 126, and the action may be executed by the rule engine core 124, via the third thread 122 to cause facts or objects to propagate through the network.

While the state machine 128 is in a reactive state (and consequently, the rule engine core 124 is placed in a reactive state), a command may be added in the queue 126 and the state machine 128 is informed about the insertion of the command. The command may be added by any of the first thread, the second thread 120, or the third thread 122. Prior to processing the command, the rule engine core 124 may determine whether the queue 126 was empty before the command is inserted. If the queue 126 was not empty, that is, at least one other command was batched to the queue 126, the new command may be added as the head of the queue 126. The rule engine core 124 may remain in its current state and no changes to the rule engine core's 124 state may be made by the state machine 128. If the queue 126 is empty and does not contain any commands, the state machine is in a passive state (because the third thread 122 is not accessing the rule engine core 124 to process a command). Thus, the rule engine core 124 is in an inactive state. Therefore, the third thread 122 is notified (and subsequently woken up) in order for the rule engine core 124 to process the command placed in the queue 126. In an embodiment, when the third thread 122 is notified, a potential listen point is created by the rule engine core 124. When the listen point is set, the rule engine core 124 waits for the third thread 122 to wake up. In order to reduce potential listen points, the third thread 122 may be notified to wake up when the third thread 122 is to be executed and not at other times. Therefore, the third thread 122 is not notified at every instance when an action is placed into a queue. Rather, the third thread 122 is notified when the rule engine core 124 is in an inactive state when the queue 126 is empty (and is not otherwise notified). The reduction in notifications and reduced listen points may result in a reduction of cost and may also lead to a more efficient multi-threaded rule engine.

In another embodiment, if the second thread 120 places a command in the queue 126 and no other commands exist in the queue 126 (and the rule engine core 124 is in an inactive state), the rule engine core 124 may execute the command via the second thread 120. The second thread 120 may execute the one command it places in the queue 126 but may not execute other commands that may be placed in the queue 126 by the first thread 118 or the third thread 122.

When a thread calls the state machine 128 to enter into a reactive state (i.e., a fire until halt state), the state of the rule engine core 124 (and the state machine 128) may be unknown. For example, it may not be known whether the state of the rule engine core 124 is fire all rules or not. Therefore, the state machine 128 may issue a request for a current state to the rule engine core 124. Based on the current state, the state machine 128 may wait before entering into the fire until halt state or enter the fire until halt state without waiting.

If the rule engine core 124 is already in a fire until halt state and the state machine 128 determines that the rule engine core 124 should to enter into a fire until halt state (for example, based upon one of the multiple threads placing an action in the queue 126), the state is redundant so the rule engine core 124 does not do anything.

If the rule engine core 124 is in a fire all rules state and the rule engine core 124 determines that the rule engine core 124 is to enter into a fire until halt state (for example, based upon one of the multiple threads placing an action, etc., in the queue 126), the state machine 128 waits.

Figure 3:
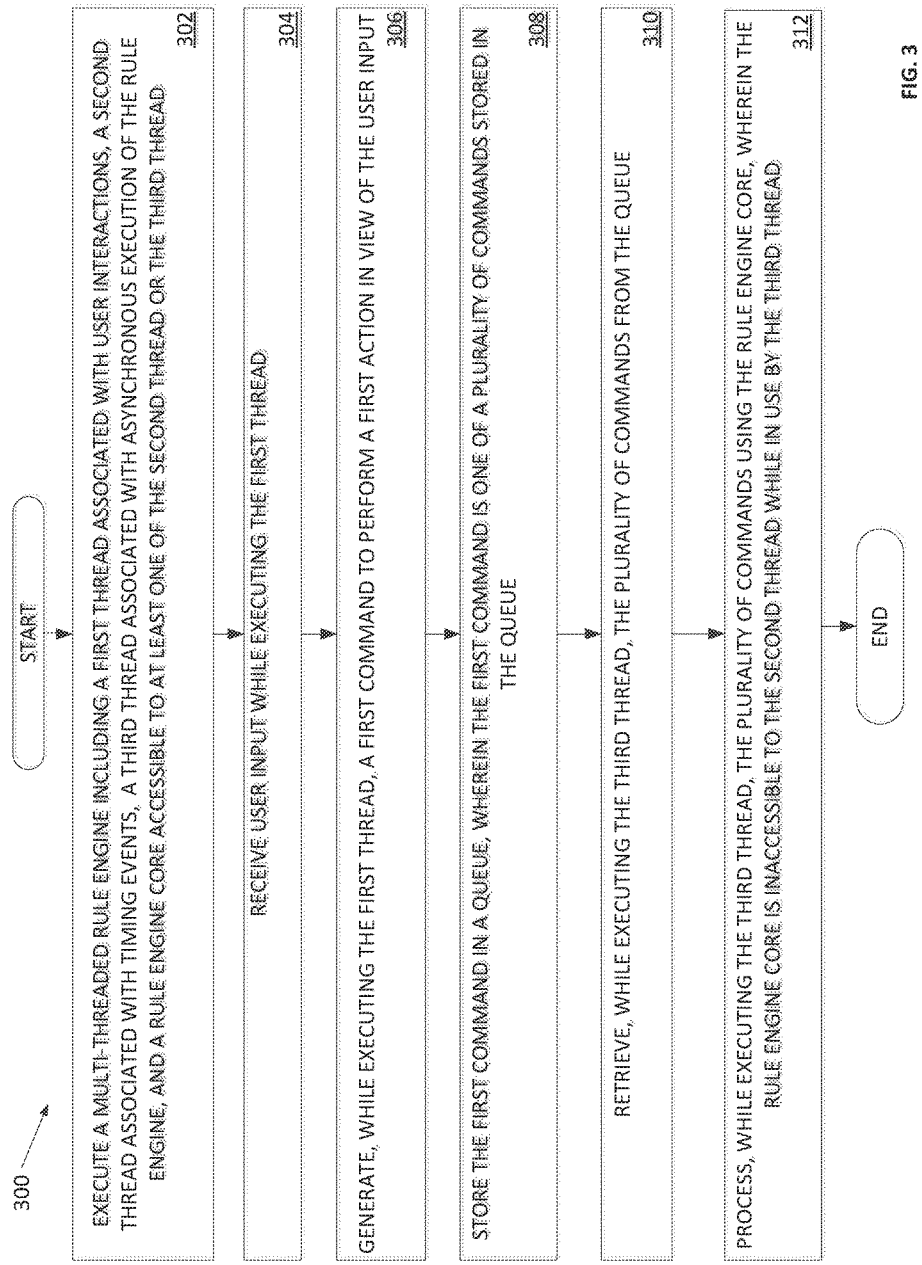
FIG. 3 illustrates one embodiment of a method to execute a multi-threaded rule engine.

FIG. 3 illustrates one embodiment of a method 300 to execute a multi-threaded rule engine. The multi-threaded rule engine may be executed in a reactive state or a passive state of a state machine. The method may be performed by processing logic that may comprise hardware (e.g., circuitry, dedicated logic, programmable logic, microcode, etc.), software (such as instructions run on a processing device), firmware, or a combination thereof. In one implementation, the methods may be performed by the multi-threaded rule engine 115 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 3, at block 302 processing logic executes a multi-threaded rule engine including a first thread, a second thread, a third thread, and a rule engine core. The first thread is associated with user interactions. The second thread is associated with timing events. The third thread is associated with asynchronous execution of the rule engine. The rule engine core is accessible to at least one of the second thread or the third thread.

At block 304, processing logic receives user input while executing the first thread. The user input may be a request for an insertion, a deletion or an update of an action. Referring now to FIG. 1, the user input may originate from the client machine 102. One of the first thread 118, the second thread 120, or the third thread 122 may receive the user input from the client machine 102, via network 103. The user input may be received while multi-threaded rule engine 115 executes the first thread 118.

At block 306, processing logic generates, while executing the first thread, a first command to perform a first action in view of the user input. The action may be an action to add a fact or object to a working memory, to modify an object, to delete an object, and so on. In an implementation, the thread which received the user input (i.e., one of the first thread 118, the second thread 120, or the third thread 122) generates a first command to perform a first action (e.g., insert, delete or update) in view of the user input. In another implementation, another component of the multi-threaded rule engine 115 generates the first command.

At block 308, processing logic stores the first command in a queue. The first command may be one of a plurality of commands stored in the queue. One of the threads stores the first command in the queue 126. In an implementation, the queue 126 informs the state machine 128 of the first command upon receiving the command. In another implementation, the thread which received the user input (i.e., one of the first thread 118, the second thread 120, or the third thread 122) informs the state machine 128 of the first command. The state of the rule engine core 124 (and that of the state machine 128) may be a reactive state if the third thread 122 is processing commands that are provided on the queue. Otherwise, the state of the rule engine core 124 may be a passive state. If other commands may already be stored in the queue 126, the queue 126 is determined as not being empty. The third thread 122 may process all commands in the queue 126 asynchronously as they are added to the queue as a result of a taking of all of the commands.

At block 310, processing logic retrieves, while executing the third thread, the plurality of commands from the queue. Because the rule engine core 124 (and the state machine 128) is in a reactive state, the rule engine core 124 is accessed by the third thread 122. The rule engine core 124 retrieves the plurality of commands (which may be placed in the queue 126 as one or more batches) from the queue 126. This retrieval is also referred to as a taking of all of the commands.

At block 312, processing logic processes, while executing the third thread, the plurality of commands using the rule engine core. The rule engine core is inaccessible to the second thread while in use by the third thread. The method then ends.

Suppose that one or more of the first thread or the second thread adds a second command to perform a second action in the queue while the rule engine core 124 is in the reactive state. In response to the second command being added to the queue, the third thread (which accesses the rule engine core) retrieves the second command from the queue and processes it.

Although the processing logic may execute any of the first, second or third thread (i.e., in order for a thread to add an action in the queue, for example), the second thread or the third thread may access the rule engine core.

Figure 4:
FIG. 4 illustrates one embodiment of a method to place a state machine into a passive state.

FIG. 4 illustrates one embodiment of a method 400 to place a state machine into a passive state. The method may be performed by processing logic that may comprise hardware (e.g., circuitry, dedicated logic, programmable logic, microcode, etc.), software (such as instructions run on a processing device), firmware, or a combination thereof. In one implementation, the methods may be performed by the multi-threaded rule engine 115 of FIG. 1.

In an embodiment, FIG. 4 is a continuation of FIG. 3. Therefore, prior to performing the method 400 of FIG. 4, a state machine may be in a reactive state.

Referring to FIG. 4, at block 402 processing logic receives a first instruction to halt the reactive state. Referring again to FIG. 2A, when the state machine is in the FIRE_UNTIL_HALT state 220, a halt ( ) 222 method may be called to halt the reactive state. The first instruction may originate from any one of the first, second or third threads.

At block 404, processing logic stops the third thread from accessing the rule engine core. The state machine enters into a halting state and stops the third thread from accessing the rule engine core. Referring again to FIG. 2A, when the halt ( ) 222 method is called, the third thread is stopped from accessing the rule engine core and the state machine enters the HALTING state 218. The state machine then proceeds to enter the INACTIVE state 206.

At block 406, processing logic places the state machine into an inactive state. Referring again to FIG. 2A, the state machine is placed into the INACTIVE state 206.

At block 408, processing logic receives a second instruction to enter a passive state and places the state machine into the passive state. The state machine receives a second instruction (i.e., fire all rules) to enter into a passive state. The state machine may receive the instruction from one of the threads associated with the second instruction or from the queue. The state machine is then placed into the passive state.

At block 410, processing logic receives one or more additional commands to perform one or more actions. The additional commands are to be stored in the queue. While the state machine is in a passive state, the threads may append additional actions onto the queue. Thus, the queue receives additional commands to perform actions.

At block 412, processing logic generates, while executing the first thread, a second command to perform a second action. In an implementation, one of the threads generates the second command to perform the second action (e.g., insert, delete or update). The second command may or may not be generated in view of user input. In another implementation, another component of the multi-threaded rule engine 115 generates the second command.

At block 414, processing logic stores the second command in the queue. The second command is one of the additional commands. One of the threads stores the first command in the queue. The queue or one of the threads that is associated with the second command informs the state machine of the second command.

At block 416, processing logic retrieves the additional one or more commands from the queue while executing the third thread.

At block 418, processing logic processes, while executing the third thread, the additional plurality of commands using the rule engine core. The rule engine core is inaccessible to the second while in use by the third thread. The method then ends.

Figure 5:
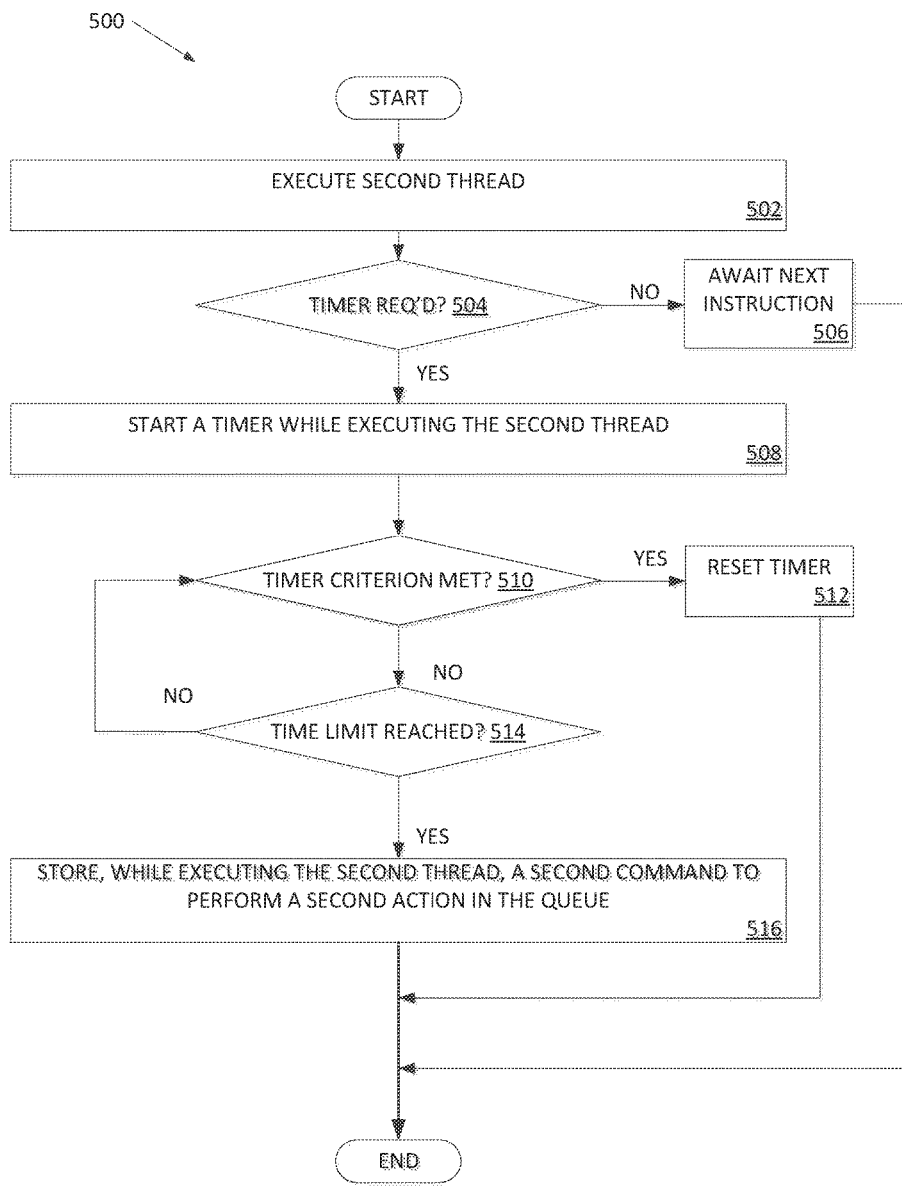
FIG. 5 illustrates one embodiment of a method to execute a second thread while a timer is initiated.

FIG. 5 illustrates one embodiment of a method 500 to execute a second thread while a timer is initiated. The method may be performed by processing logic that may comprise hardware (e.g., circuitry, dedicated logic, programmable logic, microcode, etc.), software (such as instructions run on a processing device), firmware, or a combination thereof. In one implementation, the methods may be performed by the multi-threaded rule engine 115 of FIG. 1.

Referring to FIG. 5, at block 502 processing logic executes a second thread. The second thread may be associated with timing events. The second thread may be a timer thread. An action may be associated with a time limit. The time limit may be set by the second thread 120 using the timer 121 in FIG. 1.

At decision block 504, processing logic determines whether a timer should be set. In an embodiment, a timer that is to be set may be introduced prior to execution of the second thread.

If it is determined at decision block 504 that a timer should not be set, the method proceeds to block 506. At block 506, processing logic awaits the next instruction. The method then ends.

If it is determined at decision block 504 that a timer should be set, the method proceeds to block 508. At block 508, processing logic starts a timer while executing the second thread. While processing logic executes the second thread, a timer is started. The rule engine core may start the timer while the second thread is executed. The timer may be started in view of a particular action. For example, a rule may state that upon input of a first action, a first acknowledgment should be received within fifteen seconds of the input of the first action. If an acknowledgment is not received within fifteen seconds, the rule states that an error should be reported. If a first acknowledgment is received within fifteen seconds, the timer should be reset.

At decision block 510, processing logic determines whether a timer criterion is met. If it is determined at decision block 510 that a timer criterion is met, the method proceeds to block 512. At block 512, processing logic resets the timer. For example, if a timer criterion is a first acknowledgment message and if the acknowledgement message is received, then the timer is reset. The timer may be resent by the rule engine core. The method then ends.

If it is determined at decision block 510 that a timer criterion is not met, the method proceeds to decision block 514. At decision block 514, processing logic determines whether a time limit has been reached. If it is determined at decision block 514 that a time limit has not been reached, the method loops back to decision block 510. If it is determined at decision block 514 that a time limit has been reached, the method continues to block 516. Processing logic may not receive a first acknowledgement within the allotted time.

At block 516, processing logic stores, while executing the second thread, a second command to perform a second action in the queue. The timer may expire and the second thread may inform the rule engine core of the expiration by placing the second action in the queue. Thus, processing logic may store the second command to perform the second action in the queue based on the rule while the second thread accesses the rule engine core. The rule engine core may process the command associated with the action in accordance with the rule. The method then ends.

If multiple commands are stored in the queue described in method 500 of FIG. 5, processing logic may process all of the multiple commands using the rule engine core (while the third thread accesses the rule engine core). Suppose processing logic generates, while executing the second thread, a command to perform an action after expiration of the time limit. Processing logic then stores the command in the queue. One of the threads may store the command in the queue and the state machine may be informed. Processing logic then determines that all commands in the queue are to be processed. The state machine would determine that other commands exist in the queue, and therefore that the queue is not empty. The state machine determines that the rule engine core is in a reactive state. The third thread may be executed. Processing logic then retrieves the additional commands from the queue while executing the third thread. The rule engine core may perform a taking of all of the commands and retrieve the additional commands from the queue while executing the third thread. Processing logic then processes the additional plurality of commands using the rule engine core, while the third thread accesses the rule engine core. The rule engine core is inaccessible to the second thread while in use by the third thread. In response to processing the additional commands, the third thread enters into a rest state.

Figure 6:
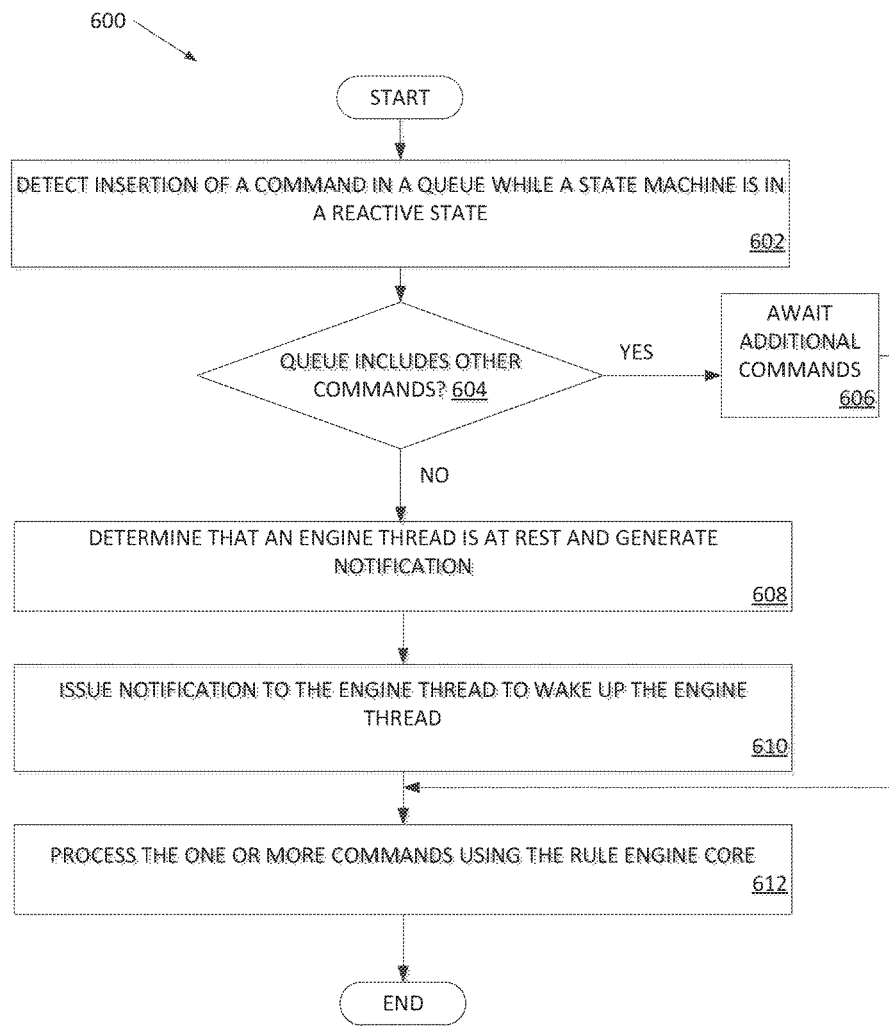
FIG. 6 illustrates one embodiment of a method to determine when to issue a notification to wake up an engine thread while a state machine is in a reactive state.

FIG. 6 illustrates one embodiment of a method 600 to determine when to issue a notification to wake up an engine thread while a state machine is in a reactive state. The method may be performed by processing logic that may comprise hardware (e.g., circuitry, dedicated logic, programmable logic, microcode, etc.), software (such as instructions run on a processing device), firmware, or a combination thereof. In one implementation, the methods may be performed by the multi-threaded rule engine 115 of FIG. 1.

Referring to FIG. 6, at block 602 processing logic detects insertion of a command in a queue while a state machine is in a reactive state.

At decision block 604, processing logic determines whether the queue includes other commands. If it is determined at decision block 604 that the queue includes other commands (and is thus not empty), the method continues to block 606. At block 606, processing logic awaits additional commands. Processing logic may wait a predetermined amount of time before the method continues to block 612. In an implementation, an instruction may be received which causes the method to go to block 612. At block 612, processing logic processes the one or more commands in the queue using the rule engine core. While one thread is executed and accesses the rule engine core to process the command(s) in the queue, a synchronization point is placed so that the propagation queue is temporarily inaccessible to another thread. As described above with respect to FIG. 2O, a sync (engineLock) is placed while the task (or command) is executing. The method then ends.

If it is determined at decision block 604 that the queue does not include any other commands (and contains the one command described in block 602), the method continues to block 610. At block 610, processing logic issues a notification to the engine thread to wake up the engine thread. The engine thread may have previously been in a rest state because no commands requiring processing were contained in the queue. At block 612, processing logic processes the one or more commands in the queue using the rule engine core. The method then ends.

Introduction of the state machine may minimize synchronization points on the queue and on the rule engine and may improve a rule engine's stability and predictability. This in turn may also provide more robust interaction between the multiple threads in a multi-threaded rule engine.

Figure 7:
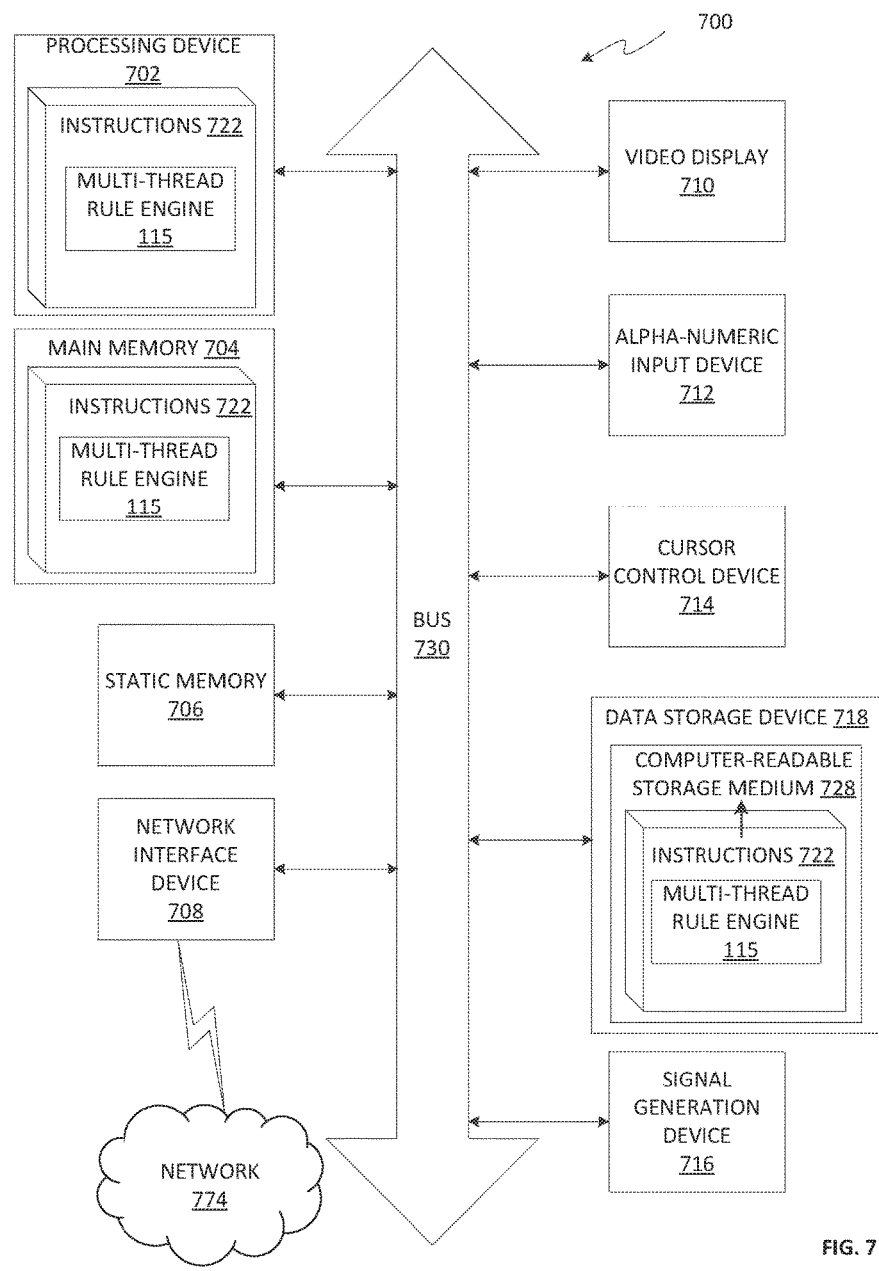
FIG. 7 illustrates a block diagram of an exemplary computing device.

FIG. 7 illustrates a diagrammatic representation of a machine in the exemplary form of a computing device 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a laptop PC, a set-top box (STB), a Personal Digital Assistant (PDA), a cellular telephone, a tablet computer, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The exemplary computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 may represent one or more general-purpose processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic (e.g., instructions 722) for performing the operations and steps discussed herein.

The computing device 700 may further include a network interface device 708 communicably coupled to a network 774. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 on which is stored one or more sets of instructions 722 embodying any one or more of the methodologies or methods described herein. The instructions 722 may also reside, completely or at least partially, within the main memory 704 and/or within the processing device 702 during execution thereof by the computing device 700, the main memory 704 and the processing device 702 also constituting machine-accessible storage media. In one embodiment, instructions 722 includes instructions for a multi-thread rule engine 115 that includes a propagation queue and a state machine and that performs operations described herein above.

While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing a set of instructions for execution by the machine and that cause the machine to perform any one or more of the methodologies of the present invention. The term "machine-readable storage medium" shall accordingly be taken to include, but not be limited to, solid-state memories, optical and magnetic media.

It is to be understood that the above description is intended to be illustrative, and not restrictive. Many other embodiments will be apparent to those of skill in the art upon reading and understanding the above description. The scope of embodiments should, therefore, be determined with reference to the appended claims, along with the full scope of equivalents to which such claims are entitled.

What is claimed is:
1. A method comprising:
    executing, by a processing device, a multi-threaded rule engine comprising a first thread associated with user interactions, a second thread associated with timing events, a third thread associated with asynchronous execution of the rule engine, and a rule engine core accessible to at least one of the second thread or the third thread;

receiving user input by the processing device while executing the first thread;

generating, by the processing device while executing the first thread, a first command to perform a first action in view of the user input;

storing the first command in a queue, wherein the first command is one of a plurality of commands stored in the queue;

retrieving, by the processing device while executing the third thread, the plurality of commands from the queue; and processing, by the processing device while executing the third thread, the plurality of commands using the rule engine core, wherein the rule engine core is inaccessible to the second thread while in use by the third thread.

2. The method of claim 1, further comprising:

placing a state machine of the multi-threaded rule engine into a reactive state, wherein the reactive state causes all commands in the queue to be processed asynchronously as they are added to the queue;

adding, by at least one of the first thread or the second thread, a second command to perform a second action to the queue; and responsive to the second command being added to the queue, retrieving the second command from the queue and processing the second command by the processing device while executing the third thread.

3. The method of claim 2, further comprising:

receiving a first instruction to halt the reactive state;

stopping the third thread from accessing the rule engine core;

placing the state machine into an inactive state;

receiving a second instruction to enter a passive state; and placing the state machine of the multi-threaded rule engine into the passive state.

4. The method of claim 3, further comprising:

generating, by the processing device while executing the first thread, a third command to perform a third action;

storing the third command in the queue, wherein the third command is one of an additional plurality of commands stored in the queue;

retrieving the additional plurality of commands from the queue by the processing device while executing the third thread; and processing, by the processing device while executing the third thread, the additional plurality of commands using the rule engine core, wherein the rule engine core is inaccessible to the second thread while in use by the third thread.

5. The method of claim 3, further comprising:

in response to determining that the rule engine core is in an inactive state, generating, by the processing device while executing the second thread, a third command to perform a third action after a time limit;

storing the third command in the queue;

retrieving the third command from the queue by the processing device while executing the second thread; and processing, by the processing device while executing the second thread, the third command using the rule engine core, wherein the rule engine core is inaccessible to the third thread while in use by the second thread, wherein in response to processing the third command, the second thread enters into a rest state.

6. The method of claim 5, wherein the third action is associated with the time limit, the method further comprising:

starting a timer by the processing device while executing the second thread;

determining that the time limit has been reached by the timer; and storing, by the processing device while executing the second thread, a fourth command to perform a fourth action in the queue.

7. The method of claim 1, further comprising:

locking the rule engine core while the processing device executing the third thread retrieves the plurality of commands from the queue, wherein the rule engine core is unlocked unless a thread is retrieving commands from the queue.

8. A system comprising a memory; and a processing device, operatively coupled to the memory, to:

execute a multi-threaded rule engine comprising a first thread associated with user interactions, a second thread associated with timing events, a third thread associated with asynchronous execution of the rule engine, and a rule engine core accessible to at least one of the second thread or the third thread;

receive user input while executing the first thread;

generate, while executing the first thread, a first command to perform a first action in view of the user input;

store the first command in a queue, wherein the first command is one of a plurality of commands stored in the queue;

retrieve, while executing the third thread, the plurality of commands from the queue; and process, while executing the third thread, the plurality of commands using the rule engine core, wherein the rule engine core is inaccessible to the second thread while in use by the third thread.

9. The system of claim 8, wherein the processing device is further to:

place a state machine of the multi-threaded rule engine into a reactive state, wherein the reactive state causes all commands in the queue to be processed asynchronously as they are added to the queue;

add, by at least one of the first thread or the second thread, a second command to perform a second action to the queue; and responsive to the second command being added to the queue, retrieve the second command from the queue and process the second command by while executing the third thread.

10. The system of claim 9, wherein the processing device is further to:

receive a first instruction to halt the reactive state;

stop the third thread from accessing the rule engine core;

place the state machine into an inactive state;

receive a second instruction to enter a passive state; and place the state machine of the multi-threaded rule engine into the passive state.

11. The system of claim 10, wherein the processing device is further to:

generate, while executing the first thread, a third command to perform a third action;

store the third command in the queue, wherein the third command is one of an additional plurality of commands stored in the queue;
retrieve the additional plurality of commands from the queue while executing the third thread; and
process, while executing the third thread, the additional plurality of commands using the rule engine core, wherein the rule engine core is inaccessible to the second thread while in use by the third thread.

12. The system of claim 10, wherein the processing device is further to:
in response to determining that the rule engine core is in an inactive state, generate, while executing the second thread, a third command to perform a third action after a time limit;
store the third command in the queue;
retrieve the third command from the queue while executing the second thread; and
process, while executing the second thread, the third command using the rule engine core, wherein the rule engine core is inaccessible to the third thread while in use by the second thread, wherein in response to processing the third command, the second thread enters into a rest state.

13. The system of claim 12, wherein the processing device is further to:
start a timer while executing the second thread;
determine that the time limit has been reached by the timer, wherein the third action is associated with the time limit; and
store, while executing the second thread, a fourth command to perform a fourth action in the queue.

14. The system of claim 8, the processing device is further to:
lock the rule engine core while the plurality of commands are retrieved from the queue, wherein the rule engine core is unlocked unless a thread retrieves commands from the queue.

15. A non-transitory computer readable storage medium comprising instructions that, when executed by a processing device, cause the processing device to:
execute, by the processing device, a multi-threaded rule engine comprising a first thread associated with user interactions, a second thread associated with timing events, a third thread associated with asynchronous execution of the rule engine, and a rule engine core accessible to at least one of the second thread or the third thread;
receive user input by the processing device while executing the first thread;
generate, by the processing device while executing the first thread, a first command to perform a first action in view of the user input;
store the first command in a queue, wherein the first command is one of a plurality of commands stored in the queue;
retrieve, by the processing device while executing the third thread, the plurality of commands from the queue; and
process, by the processing device while executing the third thread, the plurality of commands using the rule engine core, wherein the rule engine core is inaccessible to the second thread while in use by the third thread.

16. The non-transitory computer readable storage medium of claim 15, including further instructions that, when executed by the processing device, cause the processing device to:
place a state machine of the multi-threaded rule engine into a reactive state, wherein the reactive state causes all commands in the queue to be processed asynchronously as they are added to the queue;
add, by at least one of the first thread or the second thread, a second command to perform a second action to the queue; and
responsive to the second command being added to the queue, retrieve the second command from the queue and process the second command while executing the third thread.

17. The non-transitory computer readable storage medium of claim 16, including further instructions that, when executed by the processing device, cause the processing device to:
receive a first instruction to halt the reactive state;
stop the third thread from accessing the rule engine core;
place the state machine into an inactive state;
receive a second instruction to enter a passive state; and
place the state machine of the multi-threaded rule engine into the passive state.

18. The non-transitory computer readable storage medium of claim 17, including further instructions that, when executed by the processing device, cause the processing device to:
generate, while executing the first thread, a third command to perform a third action;
store the third command in the queue, wherein the third command is one of an additional plurality of commands stored in the queue;
retrieve the additional plurality of commands from the queue while executing the third thread; and
process, while executing the third thread, the additional plurality of commands using the rule engine core, wherein the rule engine core is inaccessible to the second thread while in use by the third thread.

19. The non-transitory computer readable storage medium of claim 17, including further instructions that, when executed by the processing device, cause the processing device to:
in response to determining that the rule engine core is in an inactive state, generate, while executing the second thread, a third command to perform a third action after a time limit;
store the third command in the queue;
retrieve the third command from the queue while executing the second thread; and
process, while executing the second thread, the third command using the rule engine core, wherein the rule engine core is inaccessible to the third thread while in use by the second thread, wherein in response to processing the third command, the second thread enters into a rest state.

20. The non-transitory computer readable storage medium of claim 19, including further instructions that, when executed by the processing device, cause the processing device to:
start a timer by the processing device while executing the second thread;
determine that the time limit has been reached by the timer, wherein the third action is associated with the time limit; and store, while executing the second thread, a fourth command to perform a fourth action in the queue.

\* \* \* \* \*